United States Patent
Jain et al.

(10) Patent No.: US 11,097,417 B2
(45) Date of Patent: Aug. 24, 2021

(54) SYSTEMS, DEVICES, ARTICLES AND METHODS FOR THE PARTITION OF ITEMS

(71) Applicant: Kindred Systems Inc., Vancouver (CA)

(72) Inventors: Jinendra Raja Jain, Sunnyvale, CA (US); Douglas Ian Fulop, San Francisco, CA (US); George V. Babu, Palo Alto, CA (US); David Gabriel Hallock, Redwood City, CA (US)

(73) Assignee: Kindred Systems Inc., San Francisco, CA (US)

( * ) Notice: Subject to any disclaimer, the term of this patent is extended or adjusted under 35 U.S.C. 154(b) by 406 days.

(21) Appl. No.: 15/833,869

(22) Filed: Dec. 6, 2017

(65) Prior Publication Data
US 2018/0169858 A1    Jun. 21, 2018

Related U.S. Application Data

(60) Provisional application No. 62/436,903, filed on Dec. 20, 2016.

(51) Int. Cl.
*B25J 9/00* (2006.01)
*B25J 9/16* (2006.01)
*B25J 19/02* (2006.01)

(52) U.S. Cl.
CPC ............... *B25J 9/163* (2013.01); *B25J 9/161* (2013.01); *B25J 9/1697* (2013.01); *B25J 19/021* (2013.01)

(58) Field of Classification Search
CPC . B25J 9/163; B25J 19/021; B25J 9/161; B25J 9/1697; B25J 9/1679; B25J 9/0093;
(Continued)

(56) References Cited

U.S. PATENT DOCUMENTS 8,594,835 B2 * 11/2013 Lert .................... B65G 1/1373
 700/221
9,242,799 B1 * 1/2016 O'Brien ................. G06Q 10/08
(Continued)

OTHER PUBLICATIONS

Bergeron, "Systems, Devices, Articles, and Methods for Prehension," U.S. Appl. No. 62/473,853, filed Mar. 20, 2017, 42 pages.
(Continued)

*Primary Examiner* — Ian Jen
(74) *Attorney, Agent, or Firm* — Seed IP Law Group LLP

(57) ABSTRACT

Systems, devices, articles, and methods for the partition of a plurality of items. A system including at least one processor, a frame, an end-effector coupled to the frame, and a plurality of reception spaces proximate to the end-effector. Coupled to the at least one processor is the end-effector, and a storage device storing processor-executable instructions which cause the at least one processor to direct the end-effector partition a plurality of items into two or more defined parts per a defined partition for the plurality of items. The end-effector places the plurality of items in the plurality of reception spaces. Item(s) for a respective part of the two or more defined parts are placed in a respective reception space, and may be transferred to a respective container. A method of operation of a system including at least one processor and a robot substantially as described and illustrated herein.

21 Claims, 16 Drawing Sheets

(58) Field of Classification Search
CPC ........... G05B 2219/40078; G05B 2219/40013; B07C 2501/0063; B07C 5/00; B07C 5/36; B07C 1/00; G06Q 10/06395; G06Q 50/04; G06Q 10/04; B65G 1/1375
See application file for complete search history.

(56) References Cited

U.S. PATENT DOCUMENTS

| | | | |
|---|---|---|---|
| 9,327,397 B1* | 5/2016 | Williams | B25J 3/00 |
| 9,346,619 B1* | 5/2016 | O'Brien | G05B 15/02 |
| 2007/0071585 A1* | 3/2007 | Henkel | B65G 1/0407 |
| | | | 414/471 |
| 2013/0096713 A1* | 4/2013 | Takizawa | B65G 61/00 |
| | | | 700/224 |
| 2015/0032252 A1* | 1/2015 | Galluzzo | B25J 5/007 |
| | | | 700/218 |

OTHER PUBLICATIONS

Bergeron et al., "Systems, Devices, Articles, and Methods for Prehension," U.S. Appl. No. 62/515,910, filed Jun. 6, 2017, 58 pages.

\* cited by examiner

US 11,097,417 B2

SYSTEMS, DEVICES, ARTICLES AND METHODS FOR THE PARTITION OF ITEMS

TECHNICAL FIELD

This disclosure generally relates to the field(s) of machine learning, data collection, distributed computation, and/or operation of robots.

BACKGROUND

Description of the Related Art

Machine Learning

A computer, which is a machine, can perform or succeed at one or more related tasks as defined by a measure. The computer learns if after exposure to information characterizing an event the computer improves under the measure at performing the one or more related tasks. Further, the computer learns without updates to any processor-executable instructions by imperative programming.

Robots

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to perform computational tasks. The computational tasks can be in aid of the physical tasks.

BRIEF SUMMARY

A system including a frame, a plurality of reception spaces, and at least one end-effector physically coupled to the frame and moveable to be at least proximate with the plurality of reception spaces. The system further includes a plurality of extraction spaces wherein a respective extraction space corresponds to a respective reception space of the plurality of reception spaces. The system further includes at least one processor communicatively coupled to control movement of at least the at least one end-effector, and at least one nontransitory processor-readable storage device communicatively coupled to the at least one processor and which stores processor-executable instructions. The processor-executable instructions, when executed by the at least one processor, cause the at least one processor to: direct the at least one end-effector to grasp a first respective item from a plurality of items, identify the first respective item from the plurality of items as fulfilling at least in part a first part of a defined partition for the plurality of items, direct the at least one end-effector to transfer the first respective item to a first reception space of the plurality of reception spaces. The processor-executable instructions, when executed by the at least one processor, cause the at least one processor to: direct the at least one end-effector to grasp a second respective item from the plurality of items, identify the second respective item from the plurality of items, and if the second respective item fulfills at least in part the first part of the defined partition for the plurality of items, direct the at least one end-effector to transfer the second respective item to the first reception space of the plurality of reception spaces, and if the second respective item fulfills at least in part the second part of the defined partition for the plurality of items, direct the at least one end-effector to transfer the second respective item to a second reception space of the plurality of reception spaces. The processor-executable instructions, when executed by the at least one processor, cause the at least one processor to: monitor for completion of the plurality of parts with the plurality of items, and if the first respective part of the defined partition for the plurality of items is incomplete, generate a first signal that includes processor-readable error information that represents an incomplete status for the first respective part of the plurality of parts.

A method controlled by at least one processor in communication with at least one end-effector, the method including: receiving a plurality of items in an input space reachable by the at least one end-effector, wherein the plurality of items admits to a partitioning into a plurality of parts, and partitioning sequentially, by the at least one processor and the at least one end-effector, the plurality of items. Partitioning includes: grasping, by the at least one end-effector, a first respective item from the plurality of items, identifying, by the at least one processor, the first respective item from the plurality of items as associated with a first respective part from the plurality of parts, and placing, by the at least one end-effector, the first respective item in a first respective reception space in a plurality of reception spaces. The method further includes: grasping, by the at least one end-effector, a second respective item from the plurality of items, and identifying, by the at least one at least one processor, the second respective item from the plurality of items. If the second respective item is associated with the first part of the plurality of parts, the method includes placing, by the at least one end-effector, the second respective item in the first respective reception space. If the second respective item is associated with the second part of the plurality of parts, the method includes placing the second respective item in a second respective reception space in the plurality of reception spaces. The method further includes: monitoring, by the at least one processor, for complete fulfillment of the plurality of parts by the plurality of items, and if the first respective part or the second respective part of the plurality of parts is incomplete, generating, by the at least one processor, a first signal that includes processor-readable error information that represents an incomplete status for the respective part of the plurality of parts.

A system including a frame, a plurality of reception spaces, and at least one end-effector physically coupled to the frame and moveable to be at least proximate with the plurality of reception spaces. The system further includes a plurality of extraction spaces wherein a respective extraction space corresponds to a respective reception space of the plurality of reception spaces. The system further includes at least one processor communicatively coupled to control movement of at least the at least one end-effector, and at least one nontransitory processor-readable storage device communicatively coupled to the at least one processor and which stores processor-executable instructions. The processor-executable instructions, when executed by the at least one processor, cause the at least one processor to direct the at least one end-effector to physically partition a plurality of items into two or more defined parts per a defined partition for the plurality of items, wherein a respective part of the two or more defined parts is placed in a respective reception space of the plurality of reception spaces.

A system including at least one processor and a robot substantially as described and illustrated herein.

A robot substantially as described and illustrated herein.

A method of operation of a system including at least one processor and a robot substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures in which.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as workpieces, processors, sensors, storage devices, network interfaces, frames, power cables, motors, and end-effectors, are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a robot including "an end-effector" includes a single end-effector, or two or more end-effectors. Likewise, reference to a processor communicatively coupled to an end-effector includes one processor, or two or more processors, or one, two, or more end-effectors. It should also be noted that the term "or" is generally employed in its sense including "and/or" unless the content clearly dictates otherwise.

The headings provided herein are for convenience only and do not interpret the scope or meaning of the embodiments.

Figure 1:
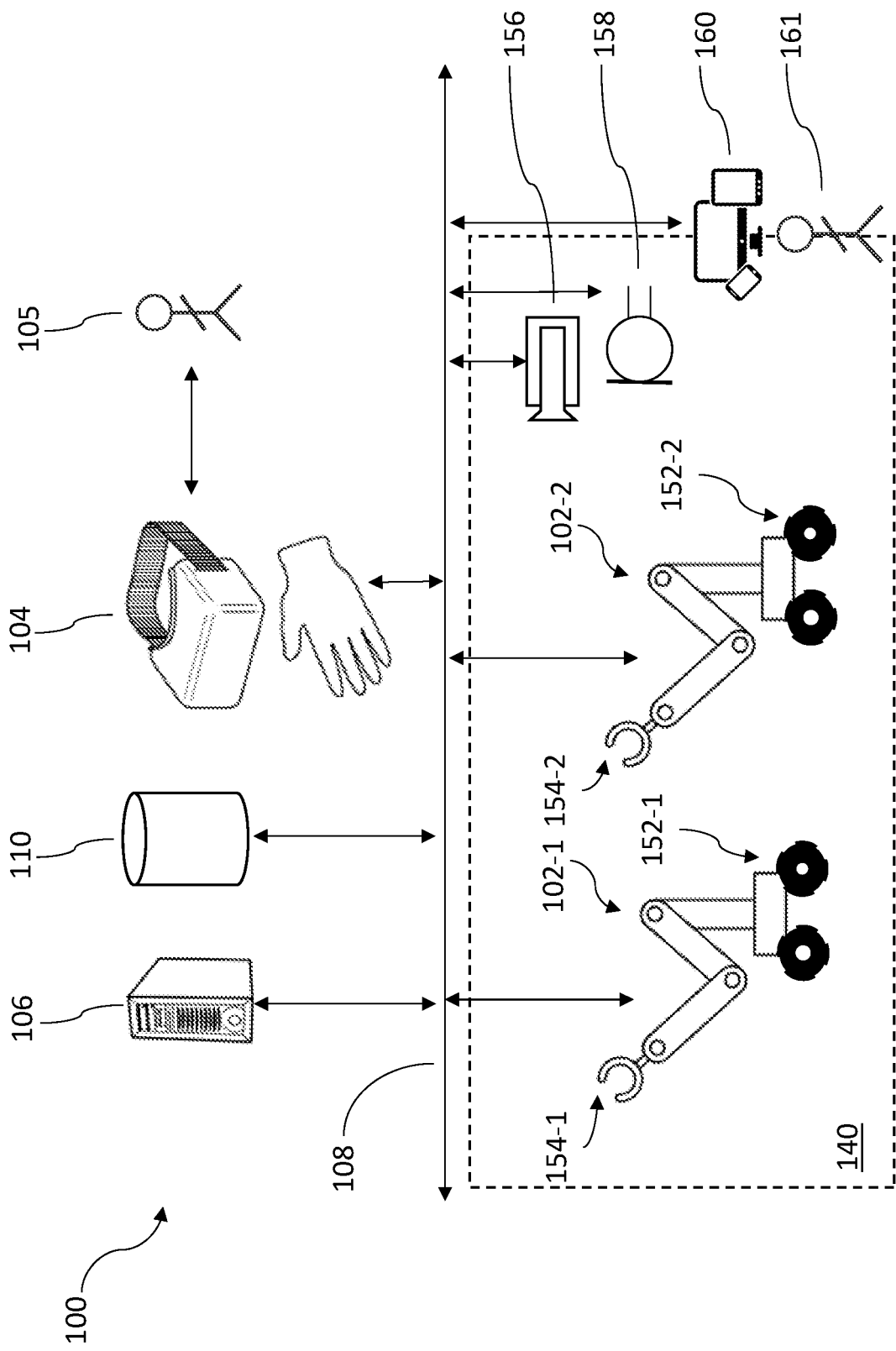
FIG. 1 is a schematic diagram illustrating a portion of a robotic system.

FIG. 1 shows an exemplary system 100 in accordance with the present system, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes at least one nontransitory computer- and processor-readable data store or storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robots 102. In some implementations, the one or more sensors are external to or separate from robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any color ball, depending on the features extracted from the sensor data, and kicking the ball. In the absence of a ball, the robot executing the autonomous robot control instructions would not kick the air as if a ball was present.

In some implementations, the computer system 106 is a smaller processor-based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, work with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., plan, as a task, to accomplish a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like. The robots 102 may operate in distribution center, stock room, or warehouse. These include a tangible place of storage for products. Principal warehouse activities include receipt of items, storage, order pick, and shipment.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasping or gripping or otherwise physically releasably engaging or otherwise interacting with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2.) A sensor subsystem acquires data that characterizes or represents the robots 102 in a context or scenario, and/or performing one or more tasks. The data includes environmental sensor information representative of environmental conditions external to robots 102.

System 100 includes an observer interface system. System 100 includes one or more observer interfaces 160 coupled to network or non-network communication channel 108. The observer interfaces 160 include input or output parts. An example of an output part is a display of explanatory text or a dynamic representation of robots 102 in a context or scenario. For example, the dynamic representation robot includes video and audio feed, for instance a computer-generated animation. Useful video and audio formats include H.264™ and Opus™ respectively. Example of an input part includes a WIMP interface. An observer 161 may observe or monitor the operation of system 100, robots 102 or the like from observer interfaces 160.

Figure 2:
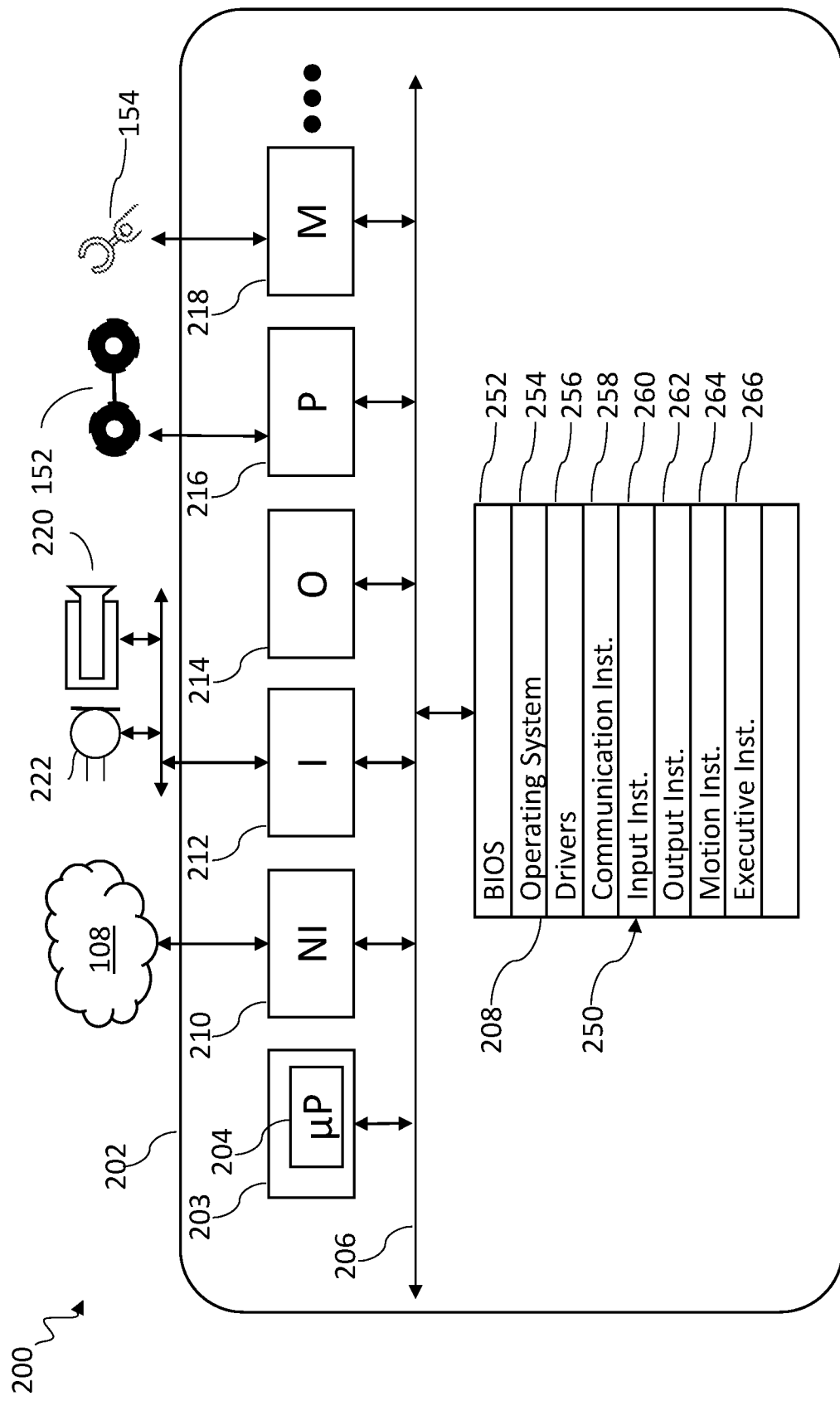
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends processor-readable information related to a plurality of items, e.g., processor-executable instructions or specifications on how to process the plurality of items. Network interface subsystem 210 allows robot 200 to be communicatively coupled to a control system via an application program interface, e.g., an application program interface in system 106. Network interface subsystem 210 receives and sends data related partition of a plurality of items. Network interface subsystem 210 may be any circuitry effecting bidirectional communication of processor-readable data, and processor-executable instructions, for instance radios (e.g., radio or microwave frequency transmitters, receivers, transceivers), communication ports and/or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. Robot 200 includes an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 may include a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, manipulators, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions or data 250 can, for example, include a basic input/output system (BIOS) 252, an operating system 254, drivers 256, communication instructions or data 258, input instructions or data 260, output instructions or data 262, motion instructions or data 264, and executive instructions or data 266.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216.

The processor-executable executive instructions or data 266 guide the robot 200 in reasoning, problem solving, planning tasks, performing tasks, and the like. The processor-executable executive instructions or data 266 implement, in part, various methods described herein, including those in and in relation to FIG. 8, etc.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
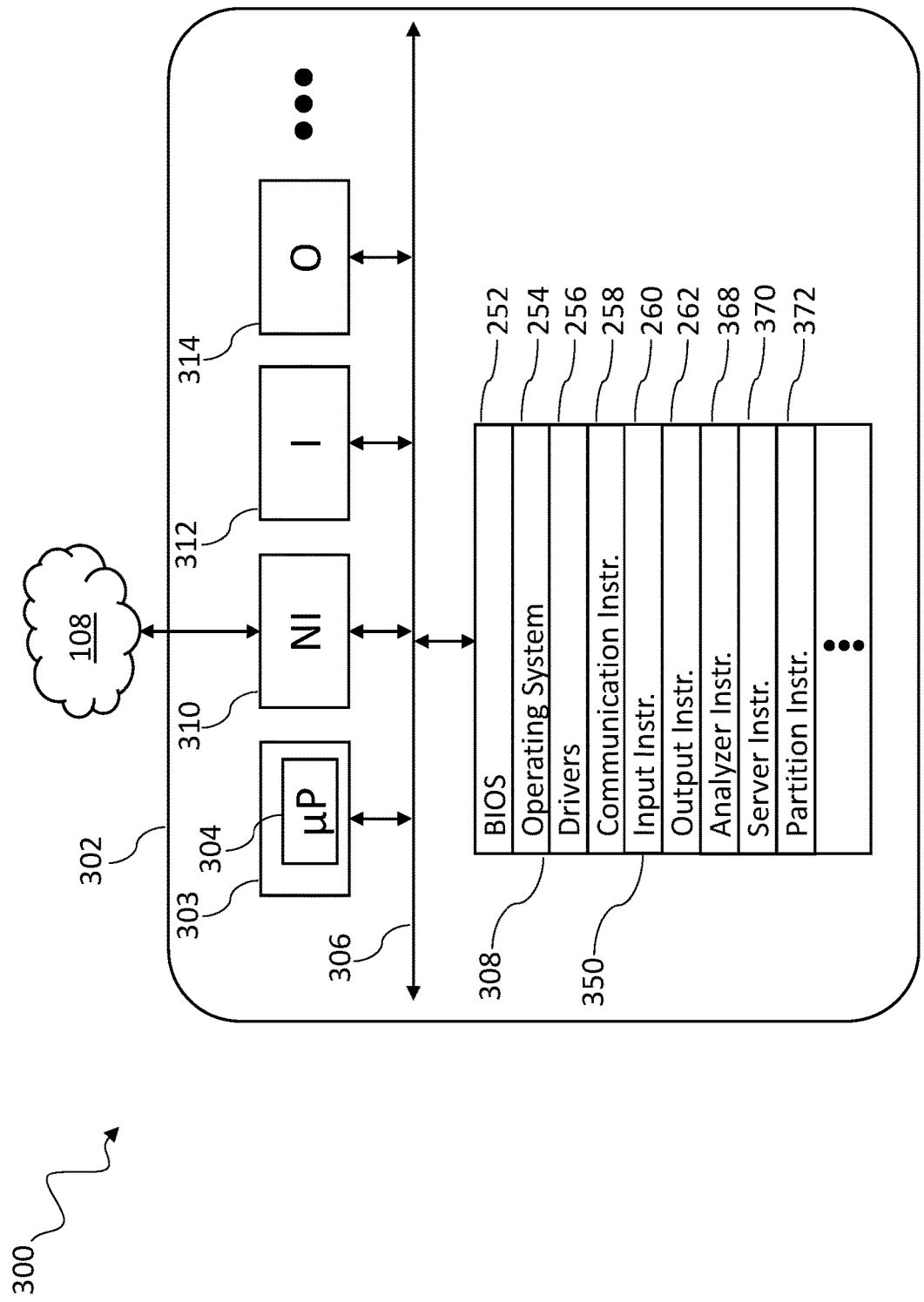
FIG. 3 is a schematic diagram illustrating an exemplary processor-based device suitable for inclusion in the system of FIG. 1.

FIG. 3 schematically shows exemplary parts of a system 300, including a processor, that may be used as system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides bi-directional communication with other systems (e.g., processor based devices associated with observers, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data 252-262 are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, and processor-executable partition instructions or data 372. The processor-executable analyzer instructions or data 368, processor-executable server instructions or data 370, and processor-executable partition instructions or data 372 may implement, in part, various methods described herein, including those in and in relation to FIGS. 8-10, and 14-16.

Processor-executable analyzer instructions or data 368, when executed by control subsystem 303, generates autonomous robot control instructions. Processor-executable server instructions or data 370, when executed by processor(s) 304, guide system 300 to coordinate the operation of system 100, and/or to act as a mediator between robots 102, system 106, and the like. Processor-executable partition instructions or data 372, when executed, guide system 300 to receive information that represents a plurality of items, receive information that represents a partition of the plurality of items, process, store or update the same information, and the like. Processor-executable partition instructions or data 372, when executed, may guide one or more devices to indicate, via an output device, a part of a plurality of parts for a partition of the plurality of items is complete or incomplete. Processor-executable partition instructions or data 372, may when executed, guide operation of device 700 shown in FIGS. 4-6 or device 1100 shown in FIGS. 11-13.

Figure 4:
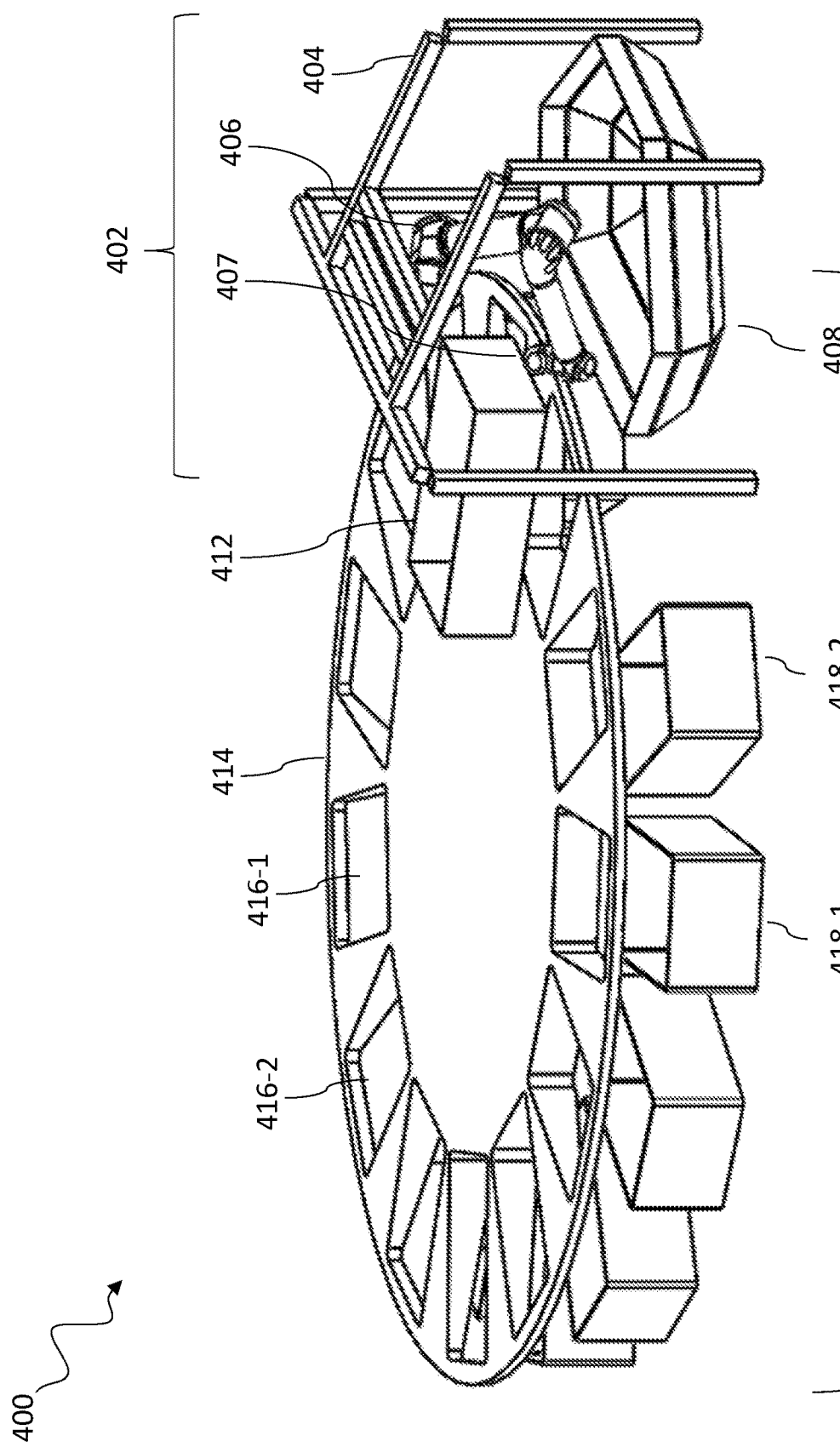
FIG. 4 illustrates, in a perspective view, an exemplary device that includes a robot, conveyor, and buffer.
Figure 5A:
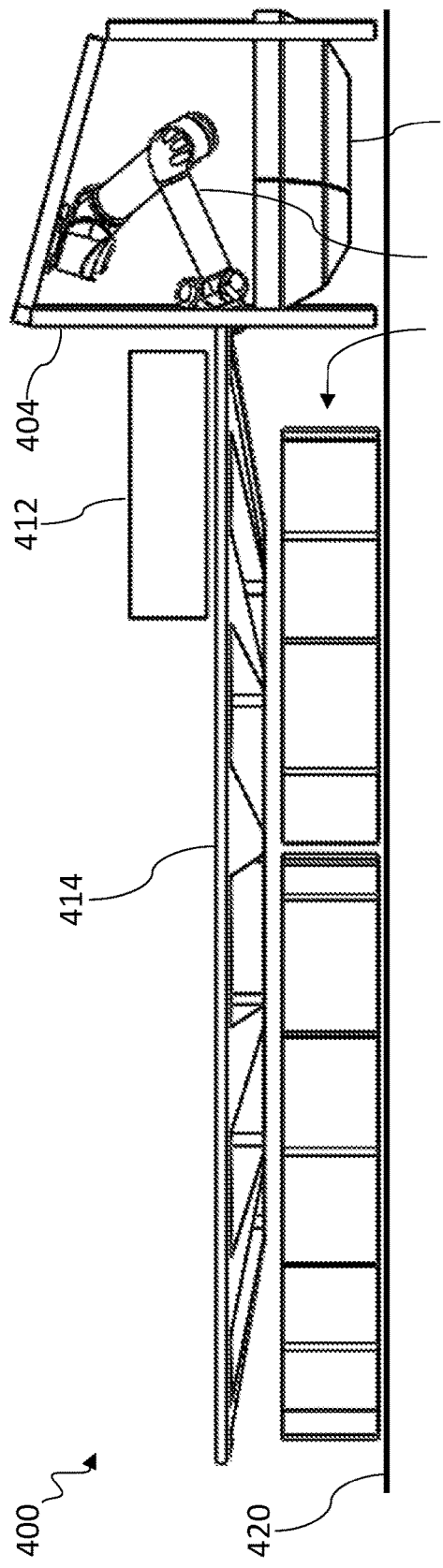
FIG. 5A and FIG. 5B illustrate, in elevation views, the device shown in FIG. 4.
Figure 5B:
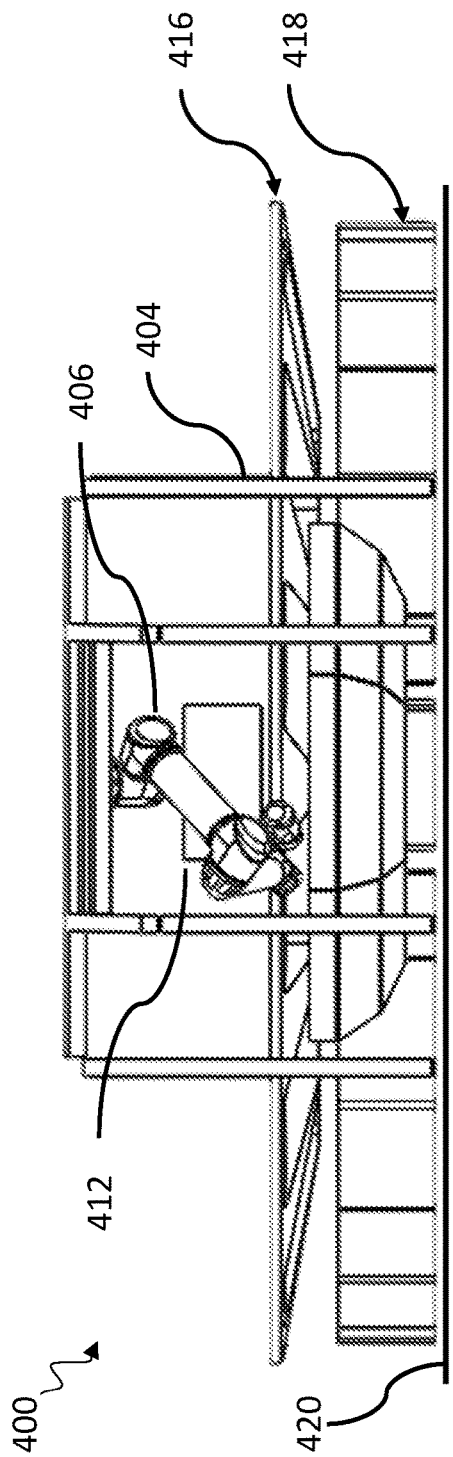

FIG. 4 shows, in perspective view, an exemplary device in accordance with the present systems, methods and articles. FIGS. 5A and 5B include elevation views of device 400, and FIG. 6 includes a plan view of device 400. Device 400 includes an input part 402 and an output part 410. In some implementations, input part 402 includes a frame 404 which may be coupled or connected to a base, e.g., floor, ground, or platform. A robot arm 406 may be coupled or connected to frame 404, e.g., connected to, or coupled to frame 404 via connection to the platform or floor. Herein device 400 and methods 700, 800, 900, and 1000 are described as being performed by one arm and end-effector. However, device 400 and methods 700, 800, 900, and 1000 may include at least one arm or end-effector.

Device 400 may include an end of arm tool or end-effector 407, e.g., gripper. Robot arm 406 may be a lightweight six joint industrial robot arm, such as, a UR5™ from Universal Robots A/S of Odense, DK-83. The UR5™ arm has a lift capacity of 5 Kg and have a working radius (e.g., extent, range) of 850 mm. Frame 404 may be sized to allow robot arm 406 to move largely unimpeded by frame 404. The UR5 arm may be fitted with an end-effector such as an EZGRIP-PER™ from Sake Robotics of Redwood City, Calif., US. Robot arm 406 may be a six joint robot arm, such as, a CR-7iA™ and CR-7iA/L™ robot arm from Fanuc America Corp., Rochester Hills, Mich., US. The CR-7iA arm has a lift capacity of 7 Kg and have a range of 717 mm and 911 mm for the CR-7iA/L™ arm. Robot arm 406, e.g., CR-7iA arm, may be fitted with an end-effector such as shown and described in commonly assigned U.S. Patent Applications Nos. 62/473,853 and 62/515,910 filed 2017 Mar. 20 and 2017 Jun. 6.

The robot arm 406 and at least one associated end-effector 407 may move items to, from, and within input area 408. Examples of items include articles, goods, objects, packages, units, and workpieces. Input area 408 may be disposed proximate to robot arm 406 and associated end-effector 407, i.e., the end-effector may grasp workpieces or items in input area 408. Robot arm 406 and associated end-effector may move workpieces or items to, from, and around input area 408. A plurality of items may be disposed in input area 408. The plurality of items may be referred to as a batch or group, may be of two or more types, or may be associated with two or more specified, partitions (i.e., parts) of the plurality of items. There may be two or more desirable partitions (e.g., action of division of a plurality into groups or parts, put into effect a scheme for division) for plurality of items.

Device 400 includes a process buffer 412 that may be disposed between input part 402 and output part 410. Process buffer 412 is an area, bin, feed zone, hopper, receiver, or workspace, which robot arm 406 and end-effector 407 may move workpieces or items to, from, and around in. Robot arm 406 may move items from input area 408 to process buffer 412, or to, from, and around in input area 408. Robot arm 406 may move a first item to process buffer 412. Robot arm 406 may move a second item to process buffer 412 to join the first item. The first and second item could be destined for one or the same partition of a set of partitions. Alternatively, device 400 may transfer the first item out of process buffer 412 and place (e.g., release above, set down in) the second item alone in process buffer 412. The first and second item could each be destined for respective ones of two different partitions of a set of partitions.

Output part 410 of device 400 includes a conveyor 414. Conveyor may be disposed proximate to process buffer 412. For example, at least a part of conveyor 414 may underlie some or all of process buffer 412. Conveyor 414 is horizontal, inclined, or vertical device that is selectively operable to move or transport items, packages, or bulk material, in a path determined at least in part by the design of the device. The path may be open or closed. The direction of movement along the path may be reversed, e.g., upon execution of processor-readable instructions the direction of movement of conveyor 414 is reversed. Conveyor 414 also includes one or more points to load, remove, inspect, or sort items, packages, or material transported by conveyor 414. Conveyor 414 may be one of various mechanical contrivances, such as, carousel, conveyor belt, cross-belt conveyor, bombardier sorter, garment or other hanging conveyor, roller conveyor, slat conveyor, trolley or cart on track, or the like. Device 400 may include a motor (not shown) that is communicatively coupled to a controller and drivingly coupled to conveyor 414 to selectively move the first conveyor in response to execution of processor-executable instructions.

Conveyor 414 includes a plurality of locations 416, e.g., disposed on, or in, conveyor 414. Device 400 may transfer one or more items from process buffer 412 to a location 416 included in conveyor 414. For example, conveyor 414 could include a load point proximate to process buffer 412, e.g., next to, partially under, or under. Device 400 can include and use a diverter (not shown) proximate to process buffer 412 to transfer one or more items from process buffer 412 to a particular location 416, e.g., a place on conveyor 414, a particular bin of a set of bins carried by conveyor 414 (not shown). Device 400 can include and use a diverter (not shown) proximate to one or more locations 416 on conveyor 414 to transfer one or more items from one or more particular locations 416 to a particular containers of a set of containers 418. Examples of diverters include devices selectively operable to move items with respect to, e.g., on or off, process buffer 412 or conveyor 414, such as, arm and end-effector, deflector paddle or vane, bombardier door (i.e., bomb bay door), push (impact) diverter, pull (rake) diverter, moving slates, pop-up skewed wheels, rollers or chains, and cross-belt unit as part of a cross belt conveyor. In various implementations, device 400 includes a bombardier door in the inferior parts of process buffer 412.

Device 400 can include and use a respective diverter (not shown) proximate a respective location 416 to transfer one or more items from respective location 416 to another place, e.g., a container or bin or addressable or indexable location. In various implementations, device 400 includes one or more bombardier doors in the inferior parts of respective location 416. Conveyor 414 may be a bombardier sorter or a modified bombardier sorter that can carry one or more items in one location and superior to bombardier door(s). A bombardier sorter includes a device from which an item is dropped down through swinging door or doors to a desired location.

Output part 410 of device 400 includes one or more areas to receive one or more containers 418. Examples of the one or more areas are disclosed herein, at least, in relation and with FIGS. 5A, 5B, and 6. A container may be a receptacle, such as, bin, box, carton, enclosure, or tote. A container may be a formed or flexible cover (e.g., bag) for the containment, packing, or shipment of items, goods, or materials. Containers 418 include exemplary container 418-1 and container 418-2 in adjacent positions. Containers 418 may be in a one-to-one mapping of locations 416 to containers 418. There may be an integer multiple of locations to containers or vice versa. Containers 418 may, for example, be arranged in one or more arrays, for instance in a circular or endless array as illustrated, or for instance in a one-dimensional or linear array or in a two-dimensional array. Containers 418 may, for example, arranged along part of a of the path of a conveyor. For example, a conveyor may have a discorectangular (i.e., stadium) shape and containers 418 may be disposed underneath one or more linear parts or curved parts of the conveyor. Not all containers 418 need to be present during operation of device 400.

FIG. 5A shows an exemplary arrangement of process buffer 412, conveyor 414, and containers 418. FIG. 5A illustrates device 400 in elevation view from a point near the bottom left corner of FIG. 4. Process buffer 412 may overlie a part of conveyor 414. Conveyor 414 may overlie some or all of containers 418. Conveyor 414 may overlie a part of one or more containers or some of containers 418.

Frame 404, input area 408, conveyor 414, or containers 418 may variously be coupled to, be affixed to, overlie, or rest on a platform 420, e.g., floor, ground, pedestal, shelf, and stage. In some implementations, frame 404 and input area 408 are coupled to a first platform, and conveyor 414 and containers 418 are coupled to a second platform.

FIG. 5B shows an exemplary arrangement of frame 404, robot arm 406, process buffer 412, locations 416, and containers 418. FIG. 5B illustrates device 400 in elevation view from a point near the bottom right corner of FIG. 4. Locations 416 may overlie some or all of containers 418. Containers 418 may rest on platform 420 or be supported thereby, for example to move therewith.

Figure 6:
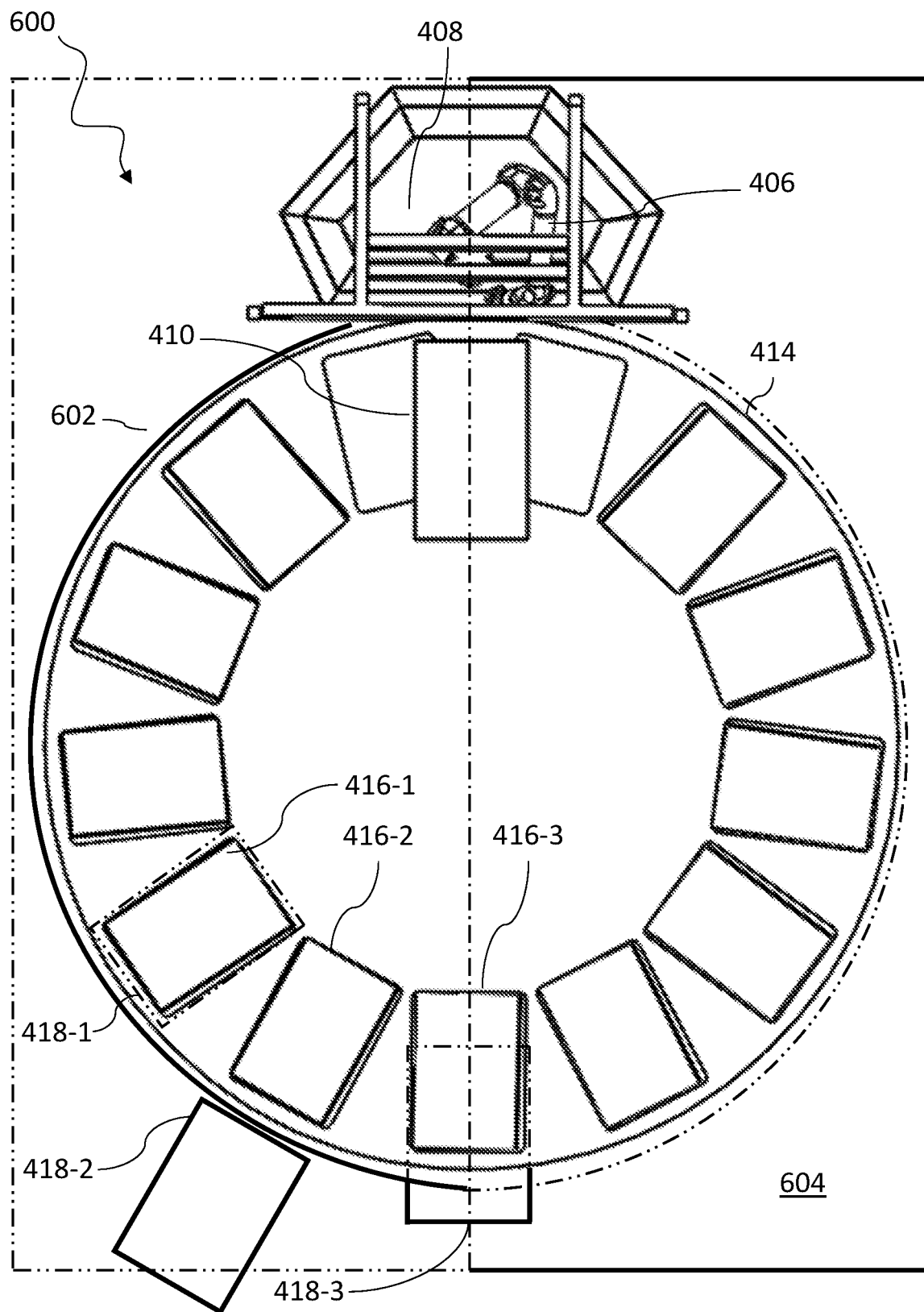
FIG. 6 illustrates, in plan view, the device shown in FIG. 4.

FIG. 6 illustrates, in plan view, device 400 and includes an exemplary arrangement of process buffer 412, conveyor 414, locations 416, and containers 418. Two options for platform 420 each with different shape are shown in FIG. 6. Containers 418 may rest on a platform, such as platform 602, that has a cooperative shape to conveyor 414. Half of platform 602 is shown in solid lines on left side of the illustrated center line and in phantom lines on the right side of the center line. Platform 602 may be a stage or shelf disposed above or below a floor. Containers 418 may rest on platform 604 with general horizontal extent that is larger than that of conveyor 414. Half of platform 604 is shown in phantom lines on the left side of the center line.

Conveyor 414 may overlie some or all of containers 418. Conveyor 414 may overlie parts of one or more containers 418. For example, location 416-1 overlies all of container 418-1 (see hidden lines). In some implementations, conveyor 414 and location 416-2 overlies an area proximate to container 418-2 (solid lines). Conveyor 414 and location 416-3 may overlie in part container 418-3 (see hidden and solid lines).

Containers 418 or the locations the containers 418 occupy may be spaced apart from each other and spaced away from the conveyor 414. A robot could place and remove containers 418 proximate to device 400. One of containers 418 could be an error container for holding items that device could not recognize or include in a defined partition of a plurality of devices.

Device 400 may include at least one sensor. The at least one sensor may include one or more sensors that detect, sensor, or measure conditions or states of device 400 and/or conditions in the environment to device 400, and provide corresponding sensor data or information including information about the state of process buffer 412, conveyor 414, a plurality of items and/or the contents of the various containers 418. Such sensors include cameras or other imagers, touch sensors, load cells, pressure sensors, microphones, RFID readers, or the like. The at least one sensor may be arranged in a sensor subsystem communicatively coupled to at least one processor.

Figure 7:
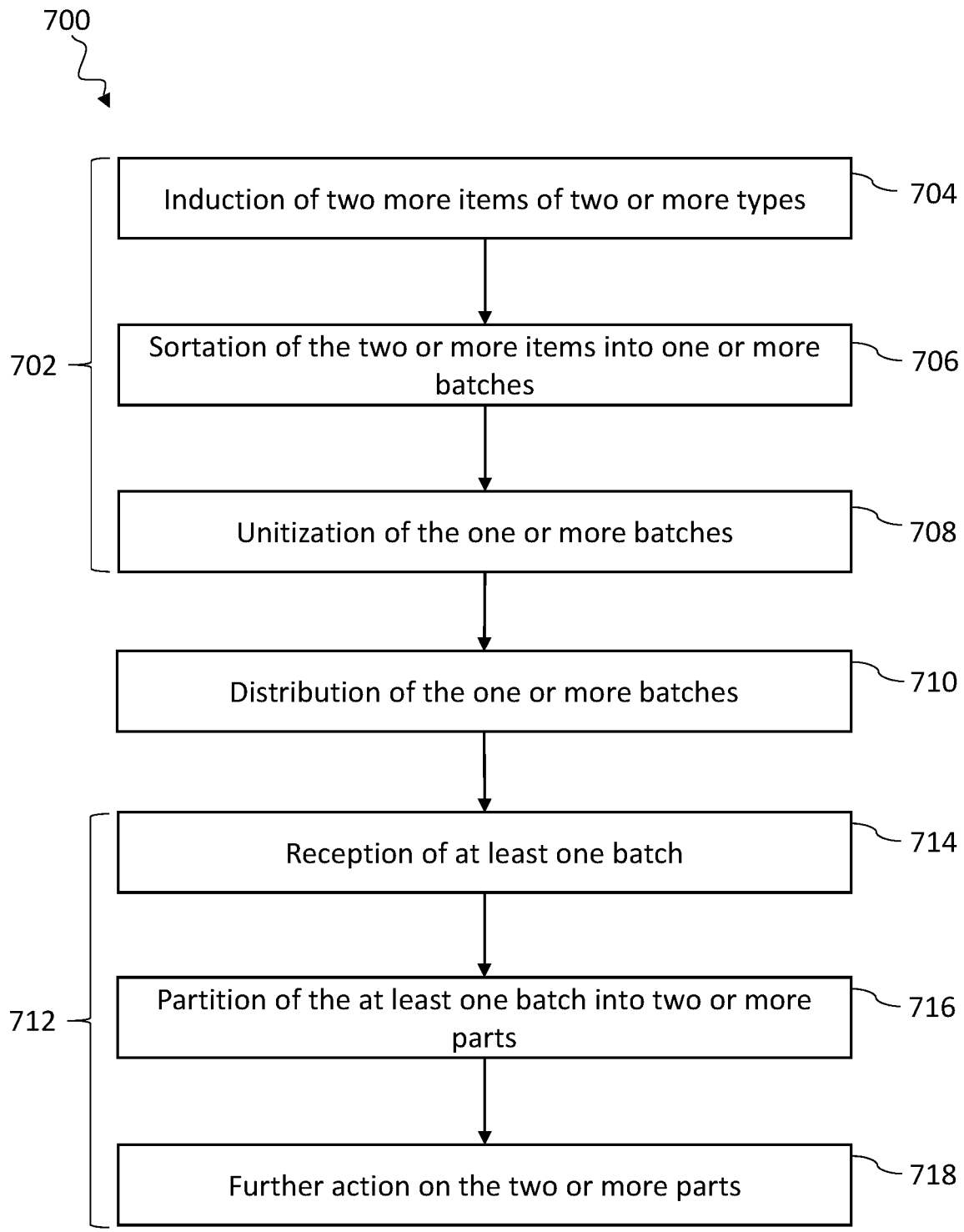
FIG. 7 is a flow-diagram of an implementation of a method of operation in one or more material handling systems.

FIG. 7 shows method 700 controlled by circuitry or at least one hardware processor. Method 700 include at least one process associated with the movement of items a supply chain. A first part 702 of method 700 may occur in a first location and a second part 712 may occur in a second location.

Method 700 begins, for example, in response to an invocation by the controller. At 704, the controller causes induction of a plurality of items into a material handling system, e.g., bombardier sorter. The items may be of two or more types. Induction can include singulation of a plurality of items into single units and deposition of the units of items into a conveyor. At 706, the controller causes sortation of the plurality of items into one or more batches. At 708, the controller causes unitization (e.g., packetization) of the one or more batches. For example, each batch is boxed, wrapped, or palletized.

At 710, the controller causes the transportation of the one or more batches. For example, each batch is dispatched via an automated or semi-automated logistics system.

At 714, the controller causes reception of at least one batch. At 716, the controller causes partition of the at least one batch into two or more parts. At 718, the controller causes further action upon the two or more parts. Some or all of acts 714, 716, and 718 may be performed by device 400.

Method 700 may in used in as part of commercial transaction. A user through a network may place order for a good from a supplier, e.g., online order. The order may be received with low per unit cost but delivered via tangible distribution system with high per unit costs, e.g., overnight delivery services. A retailer could batch orders into a box and send the box to a forward warehouse, retail store of retailer or affiliate. This may save on shipping costs and time. However, cost associated with separation of the orders may reduce the savings.

Figure 8:
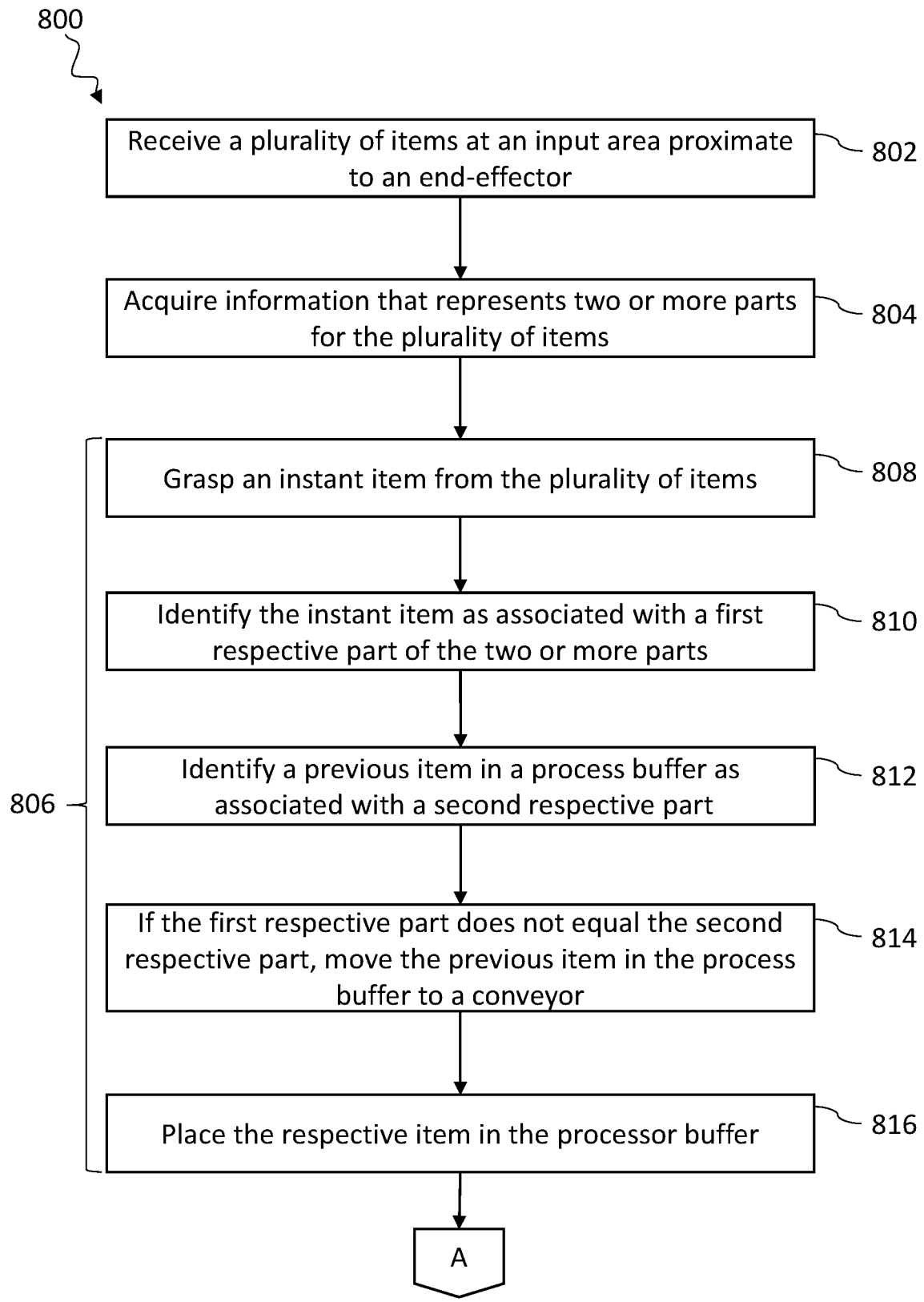
FIG. 8 is a flow-diagram of an implementation of a method of operation in a robotic system including an end-effector, which when executed, partitions a batch of items.

FIG. 8 shows a method 800 of operation of device 400. Those of skill in the art will appreciate that other acts may be included, omitted, and/or varied to accommodate alternative implementations. Method 800 is described as being performed by a controller, for example, control subsystem 203 or processor(s) 204 in conjunction with other components of device 400 or system 100. However, method 800 may be performed by another agent.

Method 800 begins, for example, in response to an invocation by the controller. At 802, the controller receives a plurality of items at an input area proximate to an end-effector, e.g., end-effector 407. For example, a worker or a robot places a plurality of items in input area 408 of device 400.

At 804, the controller acquires information that represents two or more parts for the plurality of items. For example, the controller acquires a partition scheme for the plurality of items specifying how the plurality of items, which need not all be unique, may be partitioned to a plurality of parts. The controller may receive information via communication channel like communication channel 108 shown in at least FIG. 1. The controller may retrieve the information as processor-readable data stored on a storage device.

At 806, the controller sequentially partitions the plurality of items. Partitioning includes repetition of acts 808-820. As well, for brevity it is assumed there has been one iteration of acts in the description below. A more verbose description is included herein below.

At 808, the controller causes the end-effector to grasp an instant item from the plurality of items. At 810, the controller identifies the instant item as associated with an instant part value corresponding to the plurality of parts, e.g., a first respective part of the two or more parts. For example, the controller receives information from one or more sensors and resolves the identity of the instant item. Act 810 may occur prior to act 808.

At 812, which may occur in a previous iteration of 806, the controller identifies a previous item in a process buffer, such as process buffer 412, as associated with previous part value corresponding to the plurality of parts, e.g., a first respective part or a second respective part of the two or more parts.

At 814, the controller compares the two respective parts. If the instant part value does not equal the previous part value (e.g., first respective part does not equal the second respective part) the controller causes the previous item to be moved from the process buffer to a conveyor, such as, conveyor 414. That is, the instant item and the previous items are to be in separate parts under a defined partition scheme. A part equals a part when the instant part value equals the previous part value. A part value for an item may be defined or specified in a partition scheme. For example, a first item is associated with a first part and a second item is associated with the same first part. Part values may be logically equivalent, for example, by corresponding to a same order or same destination. Thus, two different items, e.g., not the same type or stock keeping unit (SKU), may be for the same part, e.g., fulfill at least partially the same part. Conversely, two instances of the same item, e.g., same SKU, may be associated with different parts.

At 816, the controller places the instant item in the process buffer. In this way, items for a part of the two or more parts for the plurality of parts may be grouped together.

In some implementations, if instant part value equals the previous part value, the controller, causes a transfer of the previous item from the process buffer, e.g., to the conveyor. The controller directs the end-effector to transfer the instant item to the process buffer. The controller causes the previous item and the instant item to be grouped at first location, e.g., on the conveyor or disposed under the conveyor.

Method 800 continues until termination such as an error condition, receiving a stop signal, or complete partition of the plurality of items has been achieved, fulfillment of the two or more parts, or the like. Processing may continue in method 900 shown in FIG. 900.

The controller may receive a plurality of items at an input area proximate to an end-effector. The controller may acquire information that represents or defines two or more parts for the plurality of items. The controller may partition, sequentially, the plurality of items. The partition may make use of the end-effector. The controller may cause the end-effector to grasp a first item from the plurality of items. The controller may identify the first item as associated with a first part value, e.g., a first part of the two or more parts. The controller may identify the first item before causing the end-effector to grasp the first item. The controller may cause the end-effector to place the first item in the process buffer. The controller may cause the end-effector to grasp a second item from the plurality of items. The controller may identify the second item as associated with a second part value, e.g., the first part or a second part. If the first part value equals the second part value (e.g., both values are the first part of the of the two or more parts) the controller may direct the end-effector to place the second item in the process buffer. That is, the first and the second item fulfill, at least in part, a first part of the two or more parts. If the first part value does not equal the second part value, e.g., the second part value is another part of the two or more parts, the controller may cause the first item to be transferred to a conveyor and the end-effector to place the second item in the process buffer. That is, the first item fulfills, at least in part, a first part of the two or more parts and the second item fulfills, at least in part, a second part of the two or more parts. This method repeats until termination.

Figure 9:
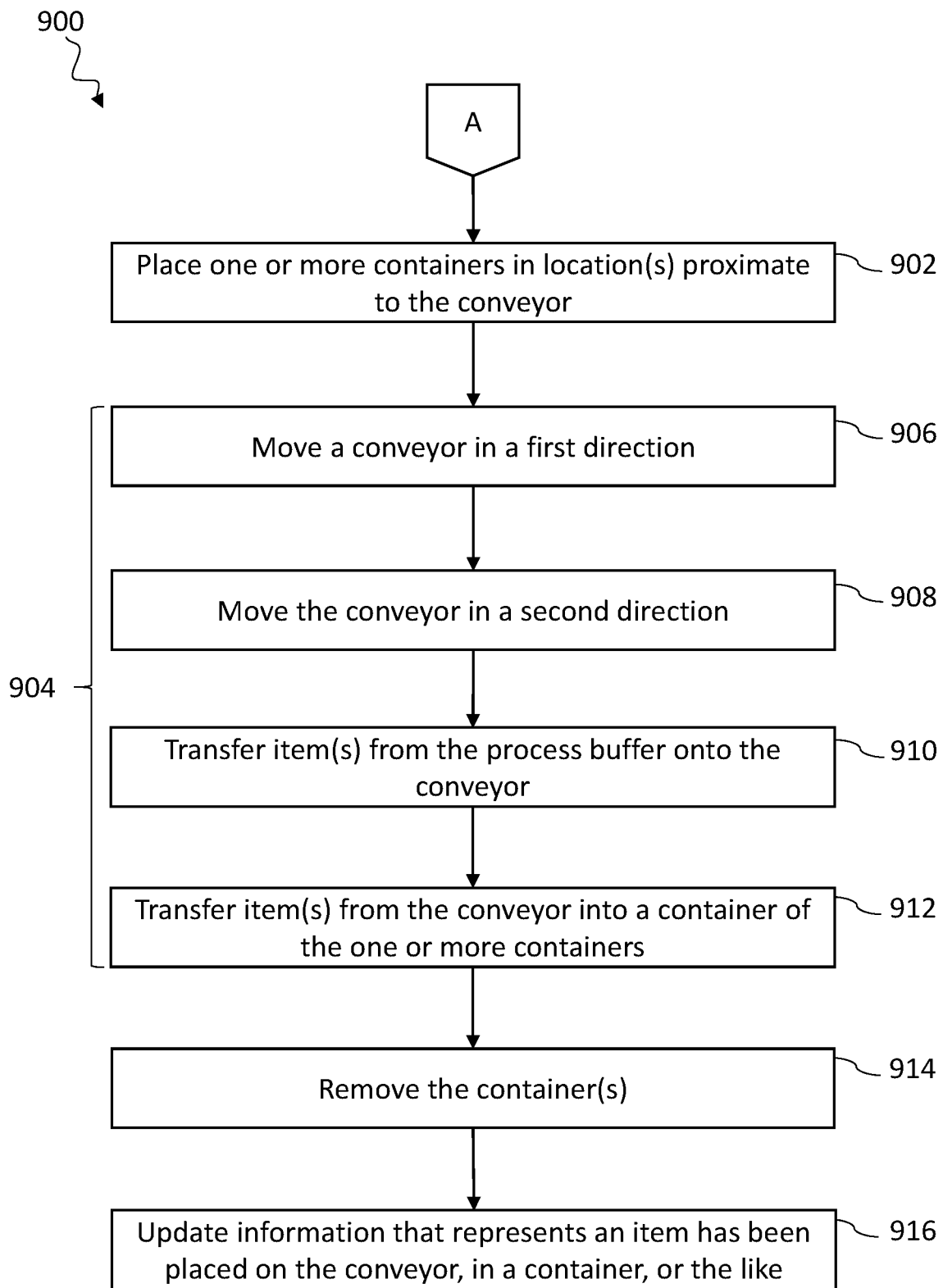
FIG. 9 is a flow-diagram of an implementation of a method of operation in a robotic system including a conveyor, which when executed, partitions a batch of items.

FIG. 9 shows a method 900 of operation of device 400. Those of skill in the art will appreciate that other acts may be included, omitted, and/or varied to accommodate alternative implementations. Method 900 is described as being performed by a controller, for example, control subsystem 303 or processor(s) 304 in conjunction with other components of device 400 or system 100. However, method 900 may be performed by another agent.

Method 900 may begin after one or more instances of method 800 have been executed. At 902, the controller causes, e.g., requests or directs, one or more containers to be placed in location(s) proximate to the conveyor. For example, at locations associated with containers 418.

At 904, the controller causes a sequential partitioning of a plurality of items. Partitioning includes repetition of one or more of acts 906-910. Acts 906-910 may be performed in any order or combination. The controller may direct a conveyor, e.g., conveyor 414, and one or more diverters with respect to the process buffer and the conveyor.

At 906, the controller may cause the conveyor to move in a first direction, e.g., clockwise. At 908, the controller may cause the conveyor to move in a second direction, e.g., counterclockwise. In act 906 and act 908, the controller may be moving items carried by the conveyor to be proximate to one or more locations. That is, cause the conveyor to move so that one or more items carried by the conveyor are proximate to one or more locations. In act 906 and act 908, the controller may be moving one or more locations, e.g., empty location(s), to be proximate to the process buffer. Acts 906 and 908 have a seek time that the process buffer masks from the end-effector.

At 910, the controller may cause a transfer of one or more items from the process buffer onto the conveyor. For example, the controller may cause a diverter to move the one or more items from the process buffer to a first location included in the conveyor.

At 912, the controller may cause a transfer of one or more items from the conveyor to one or more containers. For example, the controller may cause a diverter to move the one or more items from the conveyor to a container on a platform proximate to the conveyor, e.g., container 418-1 on platform 420.

At 914, the controller may cause, e.g., request or direct, one or more containers to be removed from the platform. The one or more containers may contain one or more parts for a partition of the plurality of items. Each container may contain one or more items.

At 916, the controller may cause an update of processor-readable information that represents the first respective item has been placed on the conveyor. At 916, the controller may cause an update of processor-readable information that represents the first respective item has been placed in a container. The processor-readable information is stored on or in at least one processor-readable storage device.

Figure 10:
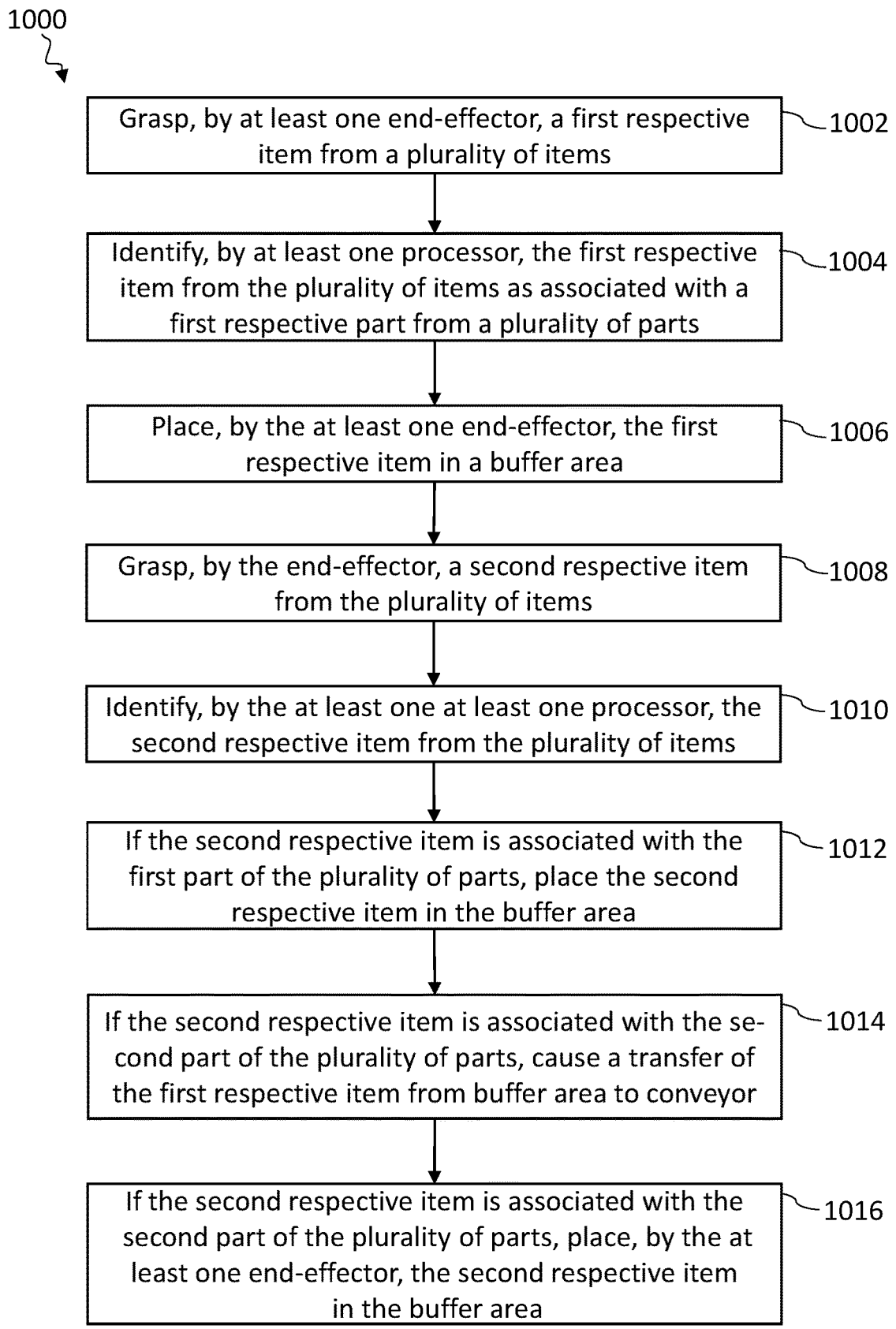
FIG. 10 is a flow-diagram of an implementation of a method of operation in a robotic system, which when executed, partitions a batch of items.

FIG. 10 shows a method 1000 of operation a robotic system. Method 1000 may be controlled by at least one processor in communication with at least one end-effector and a conveyor. Those of skill in the art will appreciate that other acts may be included, omitted, and/or varied to accommodate alternative implementations. Method 1000 is described as being performed by a controller, for example, control subsystem 303 or processor(s) 304 in conjunction with other components of device 400 or system 100. However, method 1000 may be performed by another agent.

Method 1000 begins with invocation by the at least one processor. Act 1002 starts after receiving a plurality of items in an area reachable by at least one end-effector. The plurality of items admits to a partitioning into a plurality of parts. The at least one processor, end-effector, or a conveyor partition sequentially the plurality of items, wherein partitioning includes some or all of acts 1002-1014, and may include further acts.

At 1002, the at least one end-effector grasps a first respective item from a plurality of items.

At 1004, at least one processor identifies the first respective item from the plurality of items as associated with a first respective part from a plurality of parts.

At 1006, the at least one end-effector places the first respective item in a buffer area. In some implementations, to place, by the at least one end-effector, of the first respective item in the buffer area includes the at least one end-effector releasing the first respective item above the buffer area.

At 1008, the at least one end-effector grasps a second respective item from the plurality of items.

At 1010, the at least one at least one processor identifies the second respective item from the plurality of items.

At 1012, if the second respective item is with the first part of the plurality of parts, the at least one end-effector places the second respective item in the buffer area.

At 1014, if the second respective item is associated with the second part of the plurality of parts, the at least one processor causes a transfer of the first respective item from the buffer area to the conveyor. In some implementations, the transfer includes dropping the first respective item from the buffer area to the conveyor. In some implementations, the at least one end-effector moves the first respective item from the buffer area to the conveyor.

At 1016, if the second respective item is associated with the second part of the plurality of parts, the at least one end-effector places the second respective item in the buffer area.

Figure 11:
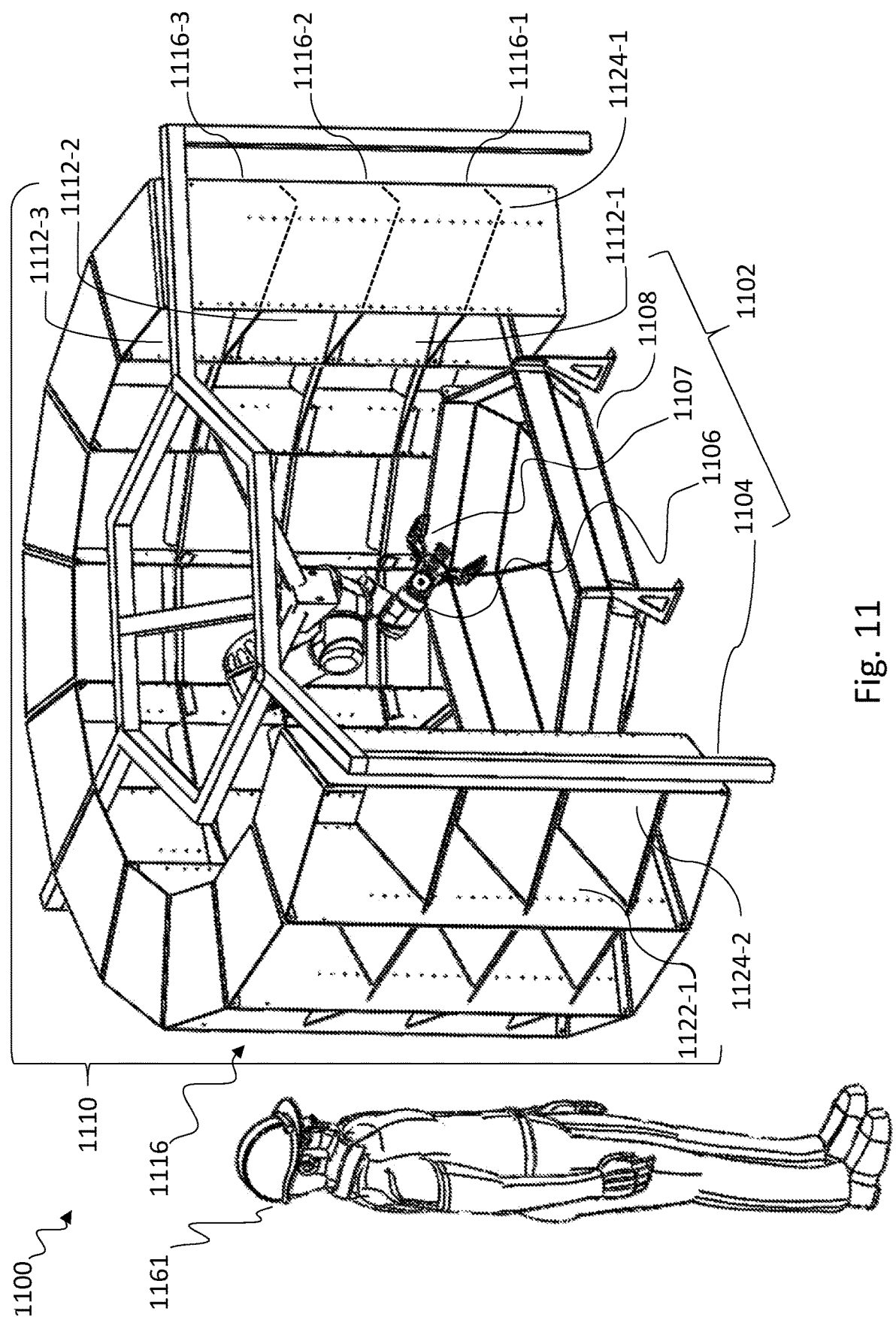
FIG. 11 illustrates, in a perspective view, an exemplary device that includes at least one end-effector, reception areas, and extraction areas.
Figure 12:
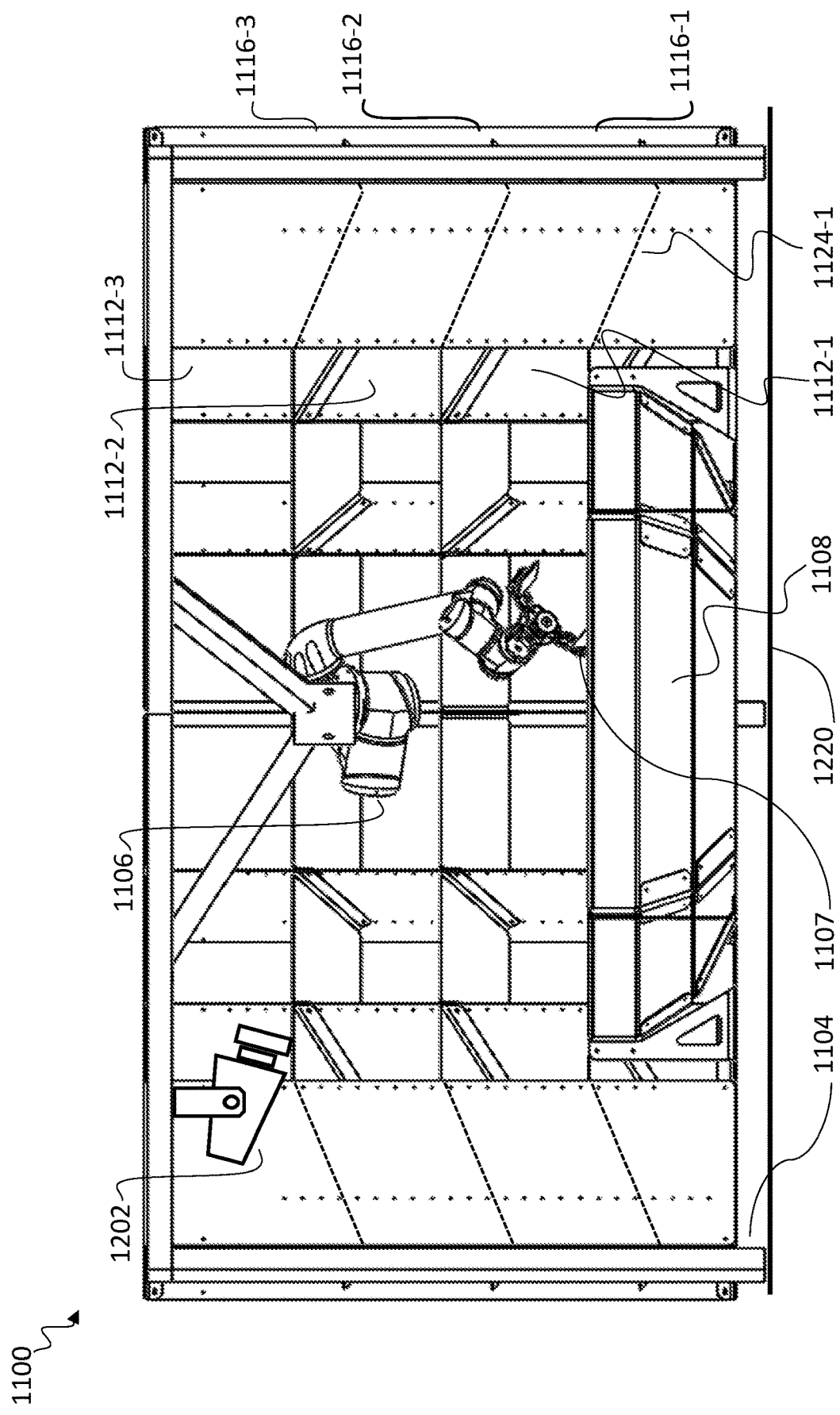
FIG. 12 illustrates, in elevation view, the device shown in FIG. 11.
Figure 13:
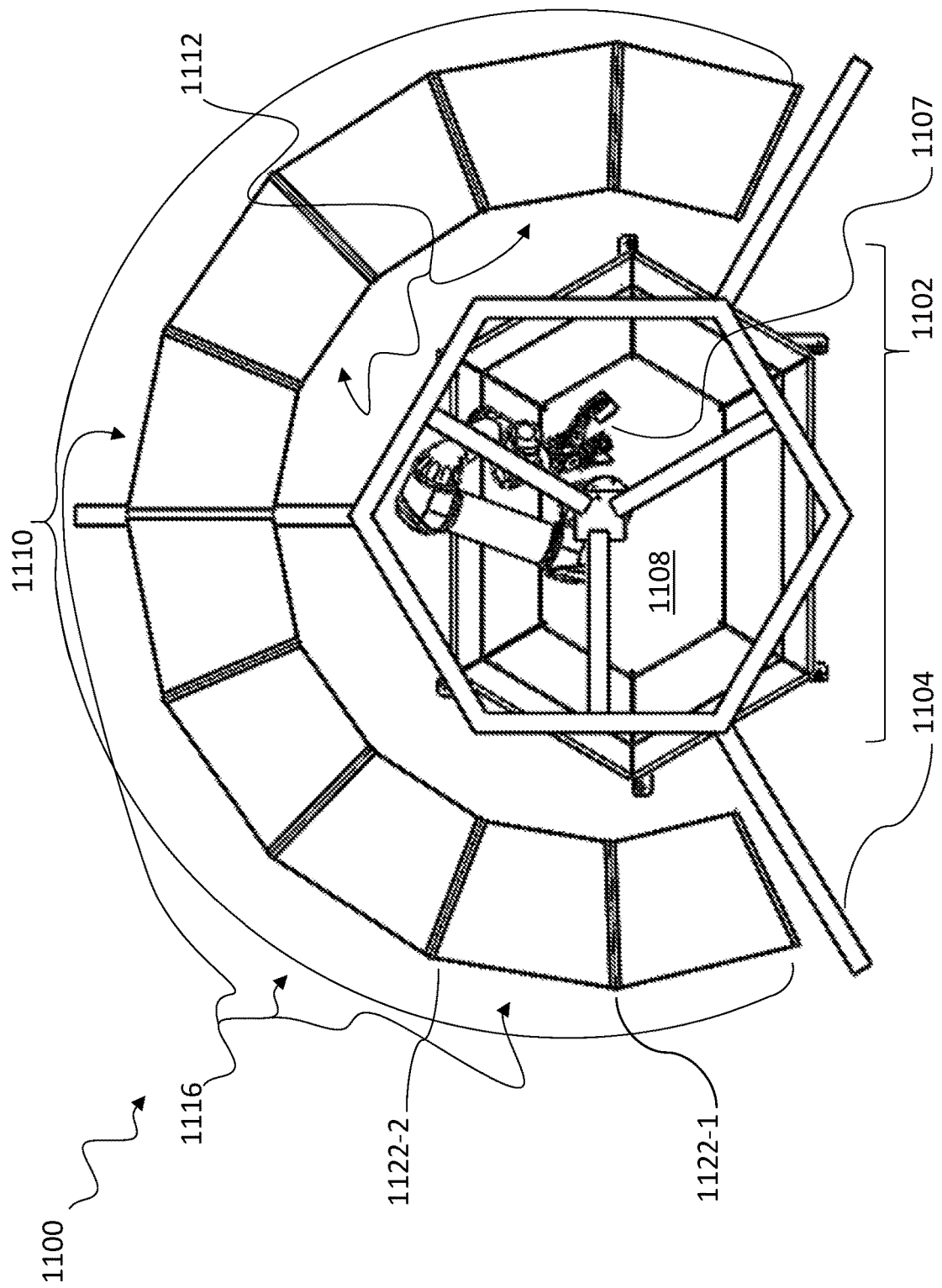
FIG. 13 illustrates, in plan view, the device shown in FIG. 11.

FIG. 11 illustrates, in a perspective view, an exemplary device 1100 in accordance with the present systems, methods and articles, along with a human worker 1161. FIG. 12 is an elevation view of device 1100, and FIG. 13 is a plan view of device 1100. Some components included in one view are not shown in a corresponding view.

Device 1100 includes an input part 1102 and an output part 1110. In some implementations, input part 1102 includes a frame 1104 which may be coupled or connected to a base, e.g., floor, ground, or platform. One or more robot arms 1106, e.g., multi-joint manipulator(s), may be coupled or connected to frame 1104. Robot arm(s) 1106 may couple to at least one end-effector 1107 distally disposed on arm(s) 1106 relative to frame 1104. Herein device 1100 and methods 700, 800, 900, 1000, 1400, 1500, et seq. are described as being performed by an arm and an end-effector. However, device 1100 and methods described herein may include at least one arm or end-effector.

Robot arm 1106 may be a lightweight six joint industrial robot arm, such as, a UR5™ from Universal Robots A/S of Odense, DK-83. The UR5™ arm has a lift capacity of 5 Kg and have a range of 850 mm. Frame 1104 may be sized to allow robot arm 1106 to move largely unimpeded by frame 1104. Robot arm 1106 may be a six joint robot arm, such as, a CR-7iA™ and CR-7iA/L™ robot arm from Fanuc America Corp., Rochester Hills, Mich., US. The CR-7iA arm has a lift capacity of 7 Kg and have a range of 717 mm and 911 mm for the CR-7iA/L™ arm. The robot arm 1106 may be fitted with an end-effector, such as, an EZGRIPPER™ from Sake Robotics of Redwood City, Calif., US; or an end-effector shown and described in commonly assigned U.S. Patent Applications Nos. 62/473,853 and 62/515,910 filed 2017 Mar. 20 and 2017 Jun. 6.

The robot arm(s) 1106 and associated end-effector(s) 1107 may move items to, from, and within input space 1108. Input space 1108 may be disposed proximate to end-effector(s) 1107 such that end-effector(s) 1107 may grasp workpieces or items in input space 1108. The end-effector(s) 1107 and associated arm(s) 1106 may move workpieces or items to, from, and around input space 1108.

A plurality of items may be disposed in input space 1108. The plurality of items may be referred to as a batch or group, may be of two or more types, or may be associated with two or more specified or defined, partitions (i.e., parts) of the plurality of items. The plurality of items item may be added to input space 1108 in tranches, e.g., one container at a time with intervening action by at least one processor or end-effector(s) 1107. Device 1100 may be used in a way such that as successive items are added to items already present in input space 1108 the addition of items is regarded as correct when the added items partially or fully complete the batch. That is, when one or more items are present in input space 1108 a correct procedure could be to only allow addition of further items to input space 1108 when the further items complete the batch. For example, two containers may be placed or dumped into an input space 1108. One human worker 1161 could provide the two containers or two different workers to provide the two containers including items. There could be some or no time separation between the adding items from the two containers.

Device 1100 includes a plurality of reception spaces 1112-1, 1112-2, 1112-3 (only three called out for clarity of drawing, collectively 1112) proximate to input space 1108 and robot arm(s) 1106. For example, the end-effector(s) 1107 and associated robot arm(s) 1106 may be moveable to be at least proximate with the plurality of reception spaces 1112. The end-effector(s) 1107 and associated arms(s) 1106 may move items from input space 1108 to the plurality of reception spaces 1112, or to, from, and around in input space 1108. The end-effector(s) 1107 and associated arm(s) 1106 may grasp a first respective item from a plurality of items in input space 1108. The end-effector(s) 1107 and associated arm(s) 1106 may transfer the first respective item to a first reception space in the plurality of reception spaces 1112, e.g., reception space 1112-1. The end-effector(s) 1107 and associated arm(s) 1106 may grasp a second respective item from the plurality of items, and may transfer the second respective item to the first reception space (e.g., reception space 1112-1) or a second reception space (e.g., reception space 1112-2, or 1112-3).

Device 1100 may include a plurality of extraction spaces 1116-1, 1116-2, 1116-3 (only three called out for clarity of drawing, collectively 1116). The plurality of extraction spaces 1116 may correspond to (e.g., one to one) the plurality of reception spaces 1112. For example, reception space 1112-1 may correspond to extraction space 1116-1, for instance the reception space 1112-1 corresponding extraction space 1116-1 may be coupled via a passage therebetween or otherwise provide access for items placed in the reception space 1112-1 to transit to the corresponding extraction space 1116-1. That is an item transferred from input space 1108 to reception space 1112-1 may be retrieved from extraction space 1116-1. The plurality of extraction spaces 1116 may overlap to (e.g., one to one) the plurality of reception spaces 1112. A pair of one reception space and one extraction space may include an overlapping volume or area. The one reception space may be accessed via a first opening and the one extraction space may be accessed via a second opening.

Device 1100 may include a plurality of septums 1122-1 (only one called out for clarity of drawing). A respective septum, e.g., septum 1122-1, may be disposed between and separate a respective pair of reception spaces 1112, or a respective pair of extraction spaces 1116. That is, a septum 1122-1 may define a boundary between a pair of spaces, e.g., separate a respective pair of reception spaces 1112, a respective pair of extraction spaces 1116, or a reception space and an extraction space.

Device 1100 may include a plurality of slides 1124-1, 1124-2 (only two called out for clarity of drawing, collectively 1124). A respective slide, e.g., slide 1124-1, may be disposed between and couple a reception space and an extraction space, e.g., reception space 1112-1 and extraction space 1116-1. That, is a slide included in the plurality of slides 1124 may allow for one or more items to be transferred (e.g., slide) from a reception space and a corresponding extraction space. The slide may be arranged such that end-effector(s) 1107 may release an item in a reception space and a worker (e.g., robot 200 or human worker 1161) may extract or retrieve the item from a corresponding extraction space.

FIG. 12 shows an exemplary arrangement of frame 1104, robot arms(s) 1106, end-effector(s) 1107, input space 1108, reception spaces 1112, and extraction spaces 1116. FIG. 12 illustrates device 1100 in elevation view from a point near the bottom right corner of FIG. 11. The reception spaces 1112 are in a position superior to input space 1108. However, the reception spaces 1112 may be positioned even with or below input space 1108. Robot arm(s) 1106 may hang from frame 1104, extend from a pedestal to be moveably proximate to input space 1108 and the reception spaces 1112.

Device 1100 may include a plurality of slides 1124. For example, slide 1124-1 may be disposed between and couple reception space 1112-1 and extraction space 1116-1. Slide 1124-1 may passively allow for one or more items to be transferred from reception space 1112-1 to extraction space 1116-1, for example under influence of the force of gravity. That is an item may slide, roll, or fall from reception space 1112-1 to extraction space 1116-1 and the may be item in contact with slide 1124-1 as it slides, rolls, or falls.

Device 1100 may include at least one sensor or transducer, for example, camera 1202 or other imager. The at least one sensor may include one or more sensors that detect, sensor, or measure conditions or states of device 1100 and/or conditions in the environment to device 1100, and provide corresponding sensor data or information including information about the state of input space 1108, reception spaces 1112, and extraction spaces 1116. Such sensors or transducers include cameras or other imagers, rangefinders, machine-readable symbol readers (e.g., barcode scanners), touch sensors, load cells, pressure sensors, microphones, RFID readers or interrogators or radios, or the like. The at least one sensor or transducer may be arranged in a sensor subsystem communicatively coupled to at least one processor.

One or more parts of device 1100 may be coupled to, e.g., rest on, be affixed to, a platform 1220. Human worker 1161 may stand on platform 1220 or a platform above or below platform 1220.

FIG. 13 illustrates, in plan view, device 1100 including an exemplary arrangement frame 1104, input part 1102, input space 1108, output part 1110, reception spaces 1112, and extraction spaces 1116. As illustrated, output part 1110 including reception spaces 1112 may wrap or curve around part of input part 1102 including input space 1108. Output part 1110 including extraction spaces 1116 may wrap or curve around part of input part 1102. Thus, the device 1100 may have an annular shape or partial annular shape or profile, for instance as viewed from a top of the device looking directly down at the device.

Device 1100 may include an output device (not shown) communicatively coupled to at least one processor, e.g., processor(s) 304. The at least one processor may direct the output device display of one or more visual indications associated with one or more extraction space. The visual indication may convey information that represents or defines a space status for respective extraction space or associated part of a plurality of parts. The space status may be a null, complete, incomplete, in process, or the like. The visual indication may convey a part is complete or incomplete. The visual indication may be based on the processor-readable information, such as, processor-readable error information that represents an incomplete space status, or the processor-readable completion information that represents a complete space status. The at least one processor may operator, e.g., selectively operate the output device in response to execution of processor-executable instructions. In various implementations, the at least one processor may generate a signal that includes processor-readable error information that represents space status information.

Device 1100 may include, as or in an output device, one or more lights proximately disposed to the respective extraction space (not shown) and communicatively coupled to the at least one processor, e.g., processor(s) 304. Device 1100 may include a plurality of lights disposed on device 1100 in location near extraction spaces 1116. Device 1100 may include as or in an output device an augmented reality display for an observer (e.g., robot or human worker 1161). and communicatively coupled to the at least one processor. Examples of an augmented reality display are shown in FIG. 1 at operator interface 104. The augmented reality display may be a display headset including a display and attitude or direction sensor, such as, an OCULUS RIFT™, or ALTERGAZE™, available, respectively, from Oculus VR of Menlo Park, Calif., US; and Altergaze Ltd of London, UK. Device 1100 may include as or in the output display in communication with the at least one processor, e.g., part of observer interfaces 160 shown in FIG. 1. Operation of one or more output devices is described herein at, at least, FIG. 16.

Figure 14:
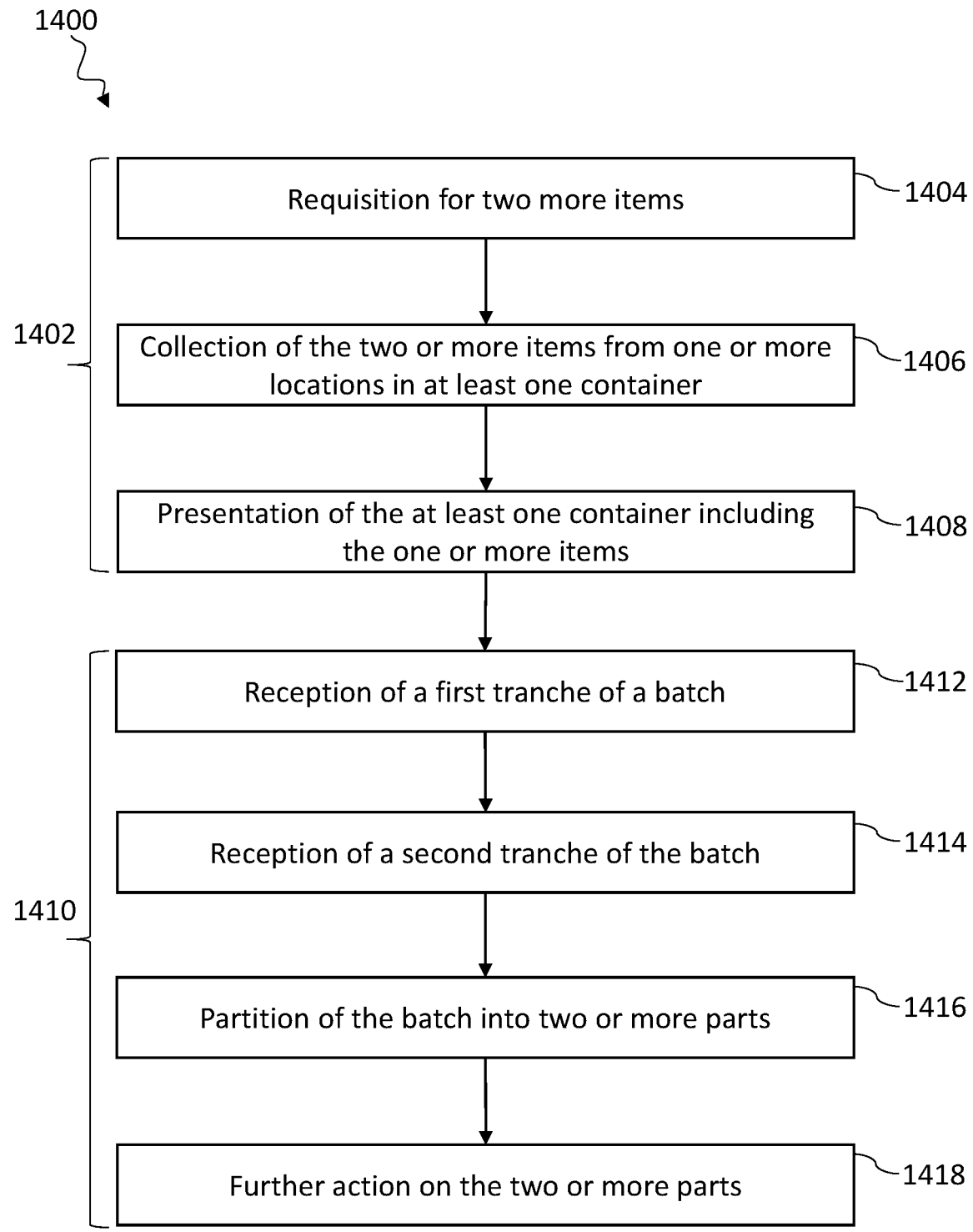
FIG. 14 is a flow-diagram of an implementation of a method of operation in one or more material handling systems.

FIG. 14 shows method 1400 controlled by circuitry or at least one hardware processor. Method 1400 include at least one process associated with the movement of items. A first part 1402 of method 1400 may occur in a first location and a second part 1410 may occur in a second location. First part 1402 and second part 1410 may occur in the same location, e.g., building, floor, area. The first part 1402 of method 1400 may occur one or more times relative to each one occurrence of the second part 1410 of method 1400.

Method 1400 begins, for example, in response to an invocation by the controller. At 1404, the controller requisitions for a plurality of items into a material handling system, e.g., picker travels to or thorough a storage area. The items may be of two or more types. At 1406, the controller causes collection of the plurality of items into one or more containers. At 1408, the controller causes presentation (e.g., production) of the one or more containers. For example, items in the one or more containers represent a batch or a tranche of a batch.

At 1412, the controller causes reception of a first tranche of the batch. At 1414, the controller causes reception of a second tranche of the batch. At 1416, the controller causes partition of the at least one batch into two or more parts. At 1418, the controller causes further action upon the two or more parts. Some or all of acts 1412, 1414, 1416, and 1418 may be performed by device 400 or device 1100.

Figure 15:
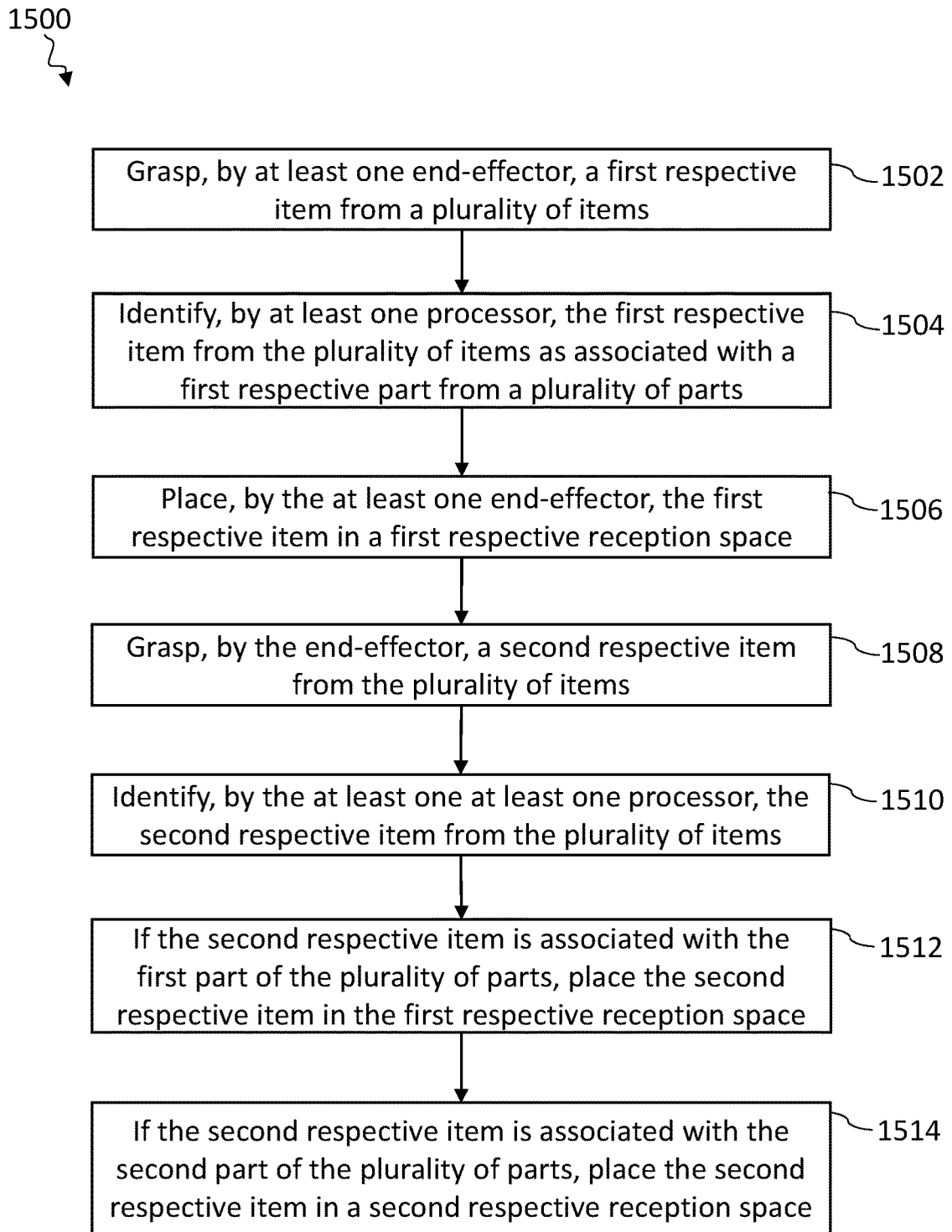
FIG. 15 is a flow-diagram of an implementation of a method of operation in a robotic system including an end-effector, which when executed, partitions a batch of items.

FIG. 15 shows a method 1500 of operation a robotic system. Method 1500 may be controlled by at least one processor in communication with at least one end-effector. Those of skill in the art will appreciate that other acts may be included, omitted, and/or varied to accommodate alternative implementations. Method 1500 is described as being performed by a controller, for example, control subsystem 303 or processor(s) 304 in conjunction with other components of device 400, device 1100, or system 100. However, method 1500 may be performed by another agent.

Method 1500 begins with invocation by the at least one processor. Act 1502 starts after receiving a plurality of items. For example, the method 1500 may start 1502 after or in response to receiving a plurality of items in input space 1108. The plurality of items admits to a partitioning into a plurality of parts. The partition of the plurality of items may make use of a plurality of reception spaces proximate to, e.g., reachable by, the at least one end-effector. The at least one processor and at least one end-effector partition sequentially the plurality of items, wherein partitioning includes some or all of acts 1502-1514, and may include further acts.

At 1502, the at least one end-effector grasps a first respective item from a plurality of items. For example, end-effector 1107 grasps an item disposed in input space 1108.

At 1504, at least one processor identifies the first respective item from the plurality of items as associated with a first respective part from a plurality of parts. For example, various machine-vision techniques can be performed on an image of the first respective item to recognize such, and/or machine-readable information (e.g., optically readable machine-readable symbol for instance a barcode symbol, unique identifier wireless read from a wireless transponder for instance an RFID transponder or RFID tag) can be read from the first respective item or a label or transponder carried by the first respective item to recognize such. The first respective part from the plurality of parts may be associated with a particular destination, e.g., extraction space 1116-1.

At 1506, the at least one end-effector places the first respective item in a first respective reception space in the plurality of reception spaces. In some implementations, to place, by the at least one end-effector, of an item in a reception space includes the at least one end-effector releasing the item above the reception space.

At 1508, the at least one end-effector grasps a second respective item from the plurality of items. The at least one processor may receive information from a sensor subsystem to isolate or resolve the second respective item from amongst the plurality of items and direct the at least one end-effector grasps the second respective item.

At 1510, the at least one at least one processor identifies the second respective item from the plurality of items. The at least one processor may receive information from a sensor subsystem to identify the second respective item, e.g., determine product or SKU for a respective item. For example, various machine-vision techniques can be performed on an image of the second respective item to recognize such, and/or machine-readable information (e.g., optically readable machine-readable symbol for instance a barcode symbol, unique identifier wireless read from a wireless transponder for instance an RFID transponder or RFID tag) can be read from the second respective item or a label or transponder carried by the second respective item to recognize such. The at least one processor may make use of a manifest for the plurality of items to identify the first or the second respective item.

At 1512, if the second respective item is associated with the first part of the plurality of parts, the at least one end-effector places the second respective item in the first respective reception space in the plurality of reception spaces.

At 1514, if the second respective item is associated with the second part of the plurality of parts, the at least one end-effector places the second respective item in the first respective reception space in the plurality of reception spaces.

Figure 16:
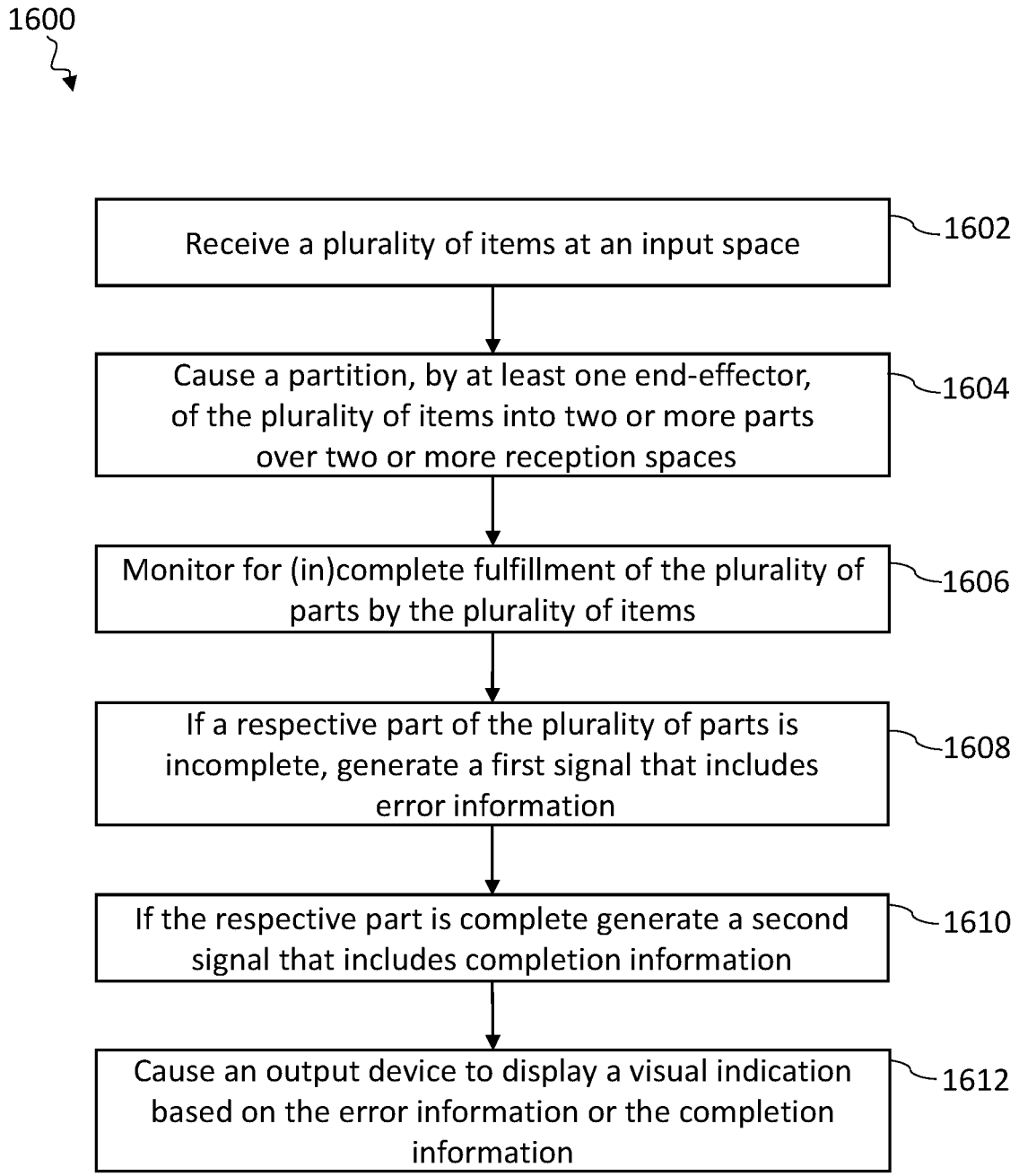
FIG. 16 is a flow-diagram of an implementation of a method of operation in a robotic system, which when executed, partitions a batch of items.

FIG. 16 shows a method 1600 of operation a robotic system. Method 1600 may be controlled by at least one processor in communication with at least one end-effector. Those of skill in the art will appreciate that other acts may be included, omitted, and/or varied to accommodate alternative implementations. Method 1600 is described as being performed by a controller, for example, control subsystem 303 or processor(s) 304 in conjunction with other components of device 400, or system 100. However, method 1600 may be performed by another agent.

Method 1600 begins with invocation by the at least one processor. At 1602, a plurality of items is received at an input space. For example, the at least one processor may receive information from a sensor subsystem where the information characterizes the plurality of items have been deposited in the input space. For example, a worker, such as worker 1161, may tip a container including a plurality of items into input area 1108 or an actuator (e.g., electric motor, solenoid, pneumatic or hydraulic piston) may automatically tip the container. The container may include an RFID tag associated with a manifest or picking list for the plurality of items.

At 1604, the at least one processor directs the at least one end-effector to partition the plurality of items into two or more parts. The two or more parts may be defined parts per a defined partition for the plurality of items. At 1604, the at least one processor directs, the at least one end-effector to transfer items from an input area to a plurality of reception spaces. One reception space in the plurality of reception spaces may receive items that fulfill, at least in part, one part of the two or more parts. The at least one processor or the at least one end-effector may perform method 1500 at act 1604.

At 1606, the at least one processor monitors for complete fulfillment of the plurality of parts by the plurality of items. At 1606, the at least one processor monitors for incomplete fulfillment of the plurality of parts by the plurality of items. For example, the at least one processor and the at least one end-effector may have portioned all of a plurality of items but one or more items for one or more orders may be missing.

At 1608, if a respective part of the plurality of parts is incomplete, the at least one processor generates a signal that includes processor-readable error information that represents an incomplete status for the respective part. The processor-readable error information may also be termed processor-readable incompletion information. The at least one processor may use the signal that includes processor-readable error information to update processor-readable information stored on or within a non-transitory processor-readable storage device. The at least one processor may cause the signal to be sent down a communication channel.

At 1610, if a respective part of the plurality of parts is complete, the at least one processor generates a signal that includes processor-readable completion information that represents a complete status for the respective part. The processor-readable completion information may be used to direct a robot or a human worker to remove the one or more items in the respective part. The least one processor may use the signal that includes processor-readable error information to update processor-readable information stored on or within a non-transitory processor-readable storage device. The at least one processor may cause the signal to be sent down a communication channel.

At 1612, the at least one processor causes display of a visual indication in an output device. The visual indication is an indication completion or incompletion associated with a respective extraction space or associated part. The visual indication may be based on the processor-readable error information that represents an incomplete status, or the processor-readable completion information that represents a complete status.

The output device may be in communication with the at least one processor. The output device may be one or more lights proximately disposed to the respective extraction space. The output device may be an augmented reality display for an observer (e.g., robot or human). The output device may be display in communication with the at least one processor.

The at least one processor may cause a change in illumination of a light proximately disposed to the respective extraction space. For example, a flashing light could mean the part associated the respective extraction space is incomplete. The at least one processor may change the illumination of the light via changing brightness, color, or flashing the light.

The at least one processor may cause, e.g., in response to executing processor-executable instructions, a change an update of a first image in an augmented reality display for an observer. The first image may overly a second image of the respective extraction space. The first image may be a halo, fringing, polygon, or the like.

The at least one processor may cause a change an update to an image in a display in communication with the at least one processor. The image may include a representation of the plurality of extraction spaces (e.g., a schematic of extraction spaces 1116). The image could, via one or more visual indications, differentiate the first respective extraction space in the representation of the plurality of extraction spaces. The visual indication could include false (de)colouring, flashing, adding a halo or fringe, and the like.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source based on the flowcharts of the figures herein, including FIGS. 7-10, 14-16, and the detailed description provided herein.

As used herein processor-executable instructions and/or data can be stored on any nontransitory computer-readable storage medium, e.g., memory or disk, for use by or in connection with any processor-related system or method. In the context of this specification, a "computer-readable storage medium" is one or more tangible nontransitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary or desirable, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a frame;
a plurality of reception spaces;
at least one end-effector physically coupled to the frame and moveable to be at least proximate with the plurality of reception spaces;
a plurality of extraction spaces wherein a respective extraction space corresponds to a respective reception space of the plurality of reception spaces;
at least one processor communicatively coupled to control movement of at least the at least one end-effector; and
at least one nontransitory processor-readable storage device communicatively coupled to the at least one processor and which stores processor-executable instructions which, when executed by the at least one processor, causes the at least one processor to:
direct the at least one end-effector to grasp a first respective item from a plurality of items,
identify the first respective item from the plurality of items as fulfilling at least in part a first part of a defined partition for the plurality of items,
direct the at least one end-effector to transfer the first respective item to a first reception space of the plurality of reception spaces,
direct the at least one end-effector to grasp a second respective item from the plurality of items,
identify the second respective item from the plurality of items,
if the second respective item fulfills at least in part the first part of the defined partition for the plurality of items, direct the at least one end-effector to transfer the second respective item to the first reception space of the plurality of reception spaces, and
if the second respective item fulfills at least in part a second part of the defined partition for the plurality of items, direct the at least one end-effector to transfer the second respective item to a second reception space of the plurality of reception spaces,
monitor for completion of the first part and the second part with the plurality of items, and
if the first part of the defined partition for the plurality of items is incomplete subsequent to successful transfer of the first respective item and the second respective item, generate a first signal that includes processor-readable error information that represents an incomplete status for the first part,
wherein the instructions cause the at least one processor to direct the at least one end-effector according to at least one direction that replays or executes previously stored piloted robot control instructions.

2. The system of claim 1 wherein, when executed, the processor-executable instructions further cause the at least one processor to:
if the first respective item or the second respective item fulfills in full the first part of the defined partition for the plurality of items, generate a second signal that includes processor-readable completion information that represents fulfillment the first part of the defined partition for the plurality of items.

3. The system of claim 2, further comprising:
an output device communicatively coupled to the at least one processor; and
wherein, when executed, the processor-executable instructions further cause the at least one processor to:
cause, by the at least one processor based on the processor-readable completion information, display of a first visual indication in the output device, wherein the first visual indication is a completion indication associated with a first respective extraction space in the plurality of extraction spaces.

4. The system of claim 1, further comprising:
an output device communicatively coupled to the at least one processor; and
wherein, when executed, the processor-executable instructions further cause the at least one processor to:
based on the processor-readable error information, display a second visual indication in the output device, wherein the second visual indication is an incompletion indication associated with a first respective extraction space in the plurality of extraction spaces.

5. The system of claim 3 wherein:
the output device includes a light proximately disposed to the first respective extraction space in the plurality of extraction spaces; and
wherein, when executed, the processor-executable instructions further cause the at least one processor to:
based on the processor-readable incompletion information or the processor-readable completion information, when present, change illumination in the light proximately disposed to the first respective extraction space in the plurality of extraction spaces.

6. The system of claim 3 wherein:
the output device includes an augmented reality display for an observer; and
wherein, when executed, the processor-executable instructions further cause the at least one processor to:
based on the processor-readable incompletion information or the processor-readable completion information, when present, update a first image in the augmented reality display for the observer, wherein the first image overlies a second image of the first respective extraction space in the plurality of extraction spaces.

7. The system of claim 3 wherein:
the output device includes a display communicatively coupled to the at least one processor; and
wherein, when executed, the processor-executable instructions further cause the at least one processor to:
based on the processor-readable incompletion information or the processor-readable completion information, when present, update a third image in the display, wherein the third image includes a representation of the plurality of extraction spaces, and differentiates the first respective extraction space in the representation of the plurality of extraction spaces.

8. The system of claim 1, further comprising:
a plurality of containers, wherein a respective container is disposed at a respective extraction space of the plurality of extraction spaces.

9. The system of claim 8 wherein the respective extraction space in the plurality of extraction spaces is spaced apart from another respective extraction space in the plurality of extraction spaces, spaced away from a respective reception space in the plurality of reception spaces, and is sized to receive the respective container from the plurality of containers.

10. The system of claim 9, further comprising:
a plurality of septums wherein a respective septum in the plurality of septums is disposed between a respective pair of reception spaces, or a respective pair of extraction spaces.

11. The system of claim 1, further comprising:
a plurality of slides wherein a respective slide in the plurality of slides is disposed between a respective reception space and a respective extraction space such that a respective item placed in the respective reception space slides to the respective extraction space.

12. The system of claim 1, further comprising: at least one multi-joint manipulator disposed between the frame and the at least one end-effector.

13. A method controlled by at least one processor in communication with at least one end-effector, the method comprising:
receiving a plurality of items in an input space reachable by the at least one end-effector;
partitioning sequentially, by the at least one processor and the at least one end-effector, the plurality of items, wherein partitioning includes:
grasping, by the at least one end-effector, a first respective item from the plurality of items;
identifying, by the at least one processor, the first respective item from the plurality of items as associated with a first part from the plurality of parts;
placing, by the at least one end-effector, the first respective item in a first respective reception space in a plurality of reception spaces;
grasping, by the at least one end-effector, a second respective item from the plurality of items;
identifying, by the at least one at least one processor, the second respective item from the plurality of items;
if the second respective item is associated with the first part of the plurality of parts, placing, by the at least one end-effector, the second respective item in the first respective reception space;
if the second respective item is associated with a second part of the plurality of parts, placing the second respective item in a second respective reception space in the plurality of reception spaces; and
monitoring, by the at least one processor, for complete fulfillment of the plurality of parts with the plurality of items; and
if the first part or the second part of the plurality of parts is incomplete subsequent to placing at least the first respective item and the second respective item, generating, by the at least one processor, a first signal that includes processor-readable error information that represents an incomplete status for a respective incomplete part of the plurality of parts,
wherein the partitioning includes directing the at least one end-effector according to at least one direction that replays or executes previously stored piloted robot control instructions.

14. The method of claim 13 wherein the plurality of reception spaces is associated with a plurality of extraction spaces, the method further comprising:
causing a transfer of the first respective item from the first respective reception space in the plurality of reception spaces to a respective extraction space in the plurality extraction spaces.

15. The method of claim 13, further comprising:
if the first respective item or the second respective item fulfills, in full, the first respective part of the plurality of parts, generating, by the at least one processor, a second signal that includes processor-readable completion information that represents the first respective part of the plurality of parts is complete.

16. The method of claim 15 wherein the plurality of reception spaces is associated with a plurality of extraction spaces, the method further comprising:
causing, by the at least one processor based on the processor-readable completion information that represents the first respective part of the plurality of parts is complete, display of a first visual indication in an output device, wherein the first visual indication is a completion indication associated with a first respective extraction space in the plurality of extraction spaces.

17. The method of claim 13, further comprising:
if the respective part of the plurality of parts is incomplete and is the first respective part of the plurality of parts causing, by the at least one processor based on the processor-readable error information that represents an incomplete status, display of a second visual indication in an output device, wherein the second visual indication is an incompletion indication associated with a first respective extraction space in the plurality of extraction spaces.

18. The method of claim 16, further comprising:
causing, by the at least one processor, based on, when present, the processor-readable completion information that represents the first part of the plurality of parts is complete or the processor-readable error information that represents an incomplete status, a change in illumination of a light proximately disposed to a first respective extraction space in the plurality of extraction spaces.

19. The method of claim 16, further comprising:
causing, by the at least one processor, based on, when present, the processor-readable completion information that represents the first part of the plurality of parts is complete or the processor-readable error information that represents an incomplete status, an update of a first image in an augmented reality display for an observer, wherein the first image overlies a second image of the first respective extraction space in the plurality of extraction spaces.

20. The method of claim 16, further comprising:
causing, by the at least one processor, based on, when present, the processor-readable completion information that represents the first part of the plurality of parts is complete or the processor-readable error information that represents an incomplete status, an update to a third image in a display, wherein the third image includes a representation of the plurality of extraction spaces, and differentiates the first respective extraction space in the representation of the plurality of extraction spaces.

21. A system comprising:
a frame;
a plurality of reception spaces;
at least one end-effector physically coupled to the frame and moveable to be at least proximate with the plurality of reception spaces;
a plurality of extraction spaces wherein a respective extraction space corresponds to a respective reception space of the plurality of reception spaces;
at least one processor communicatively coupled to control movement of at least the at least one end-effector; and
at least one nontransitory processor-readable storage device communicatively coupled to the at least one processor and which stores processor-executable instructions which, when executed by the at least one processor, cause the at least one processor to:

direct the at least one end-effector to physically partition a plurality of items into two or more defined parts per a defined partition for the plurality of items, wherein a respective part of the two or more defined parts is placed in a respective reception space of the plurality of reception spaces, and the direction includes directing the at least one end-effector according to at least one direction that replays or executes previously stored piloted robot control instructions;

determine, as a result of physically partitioning the plurality of items, that a defined part of the two or more defined parts is deficient; and generate, responsive to determination that the defined part is deficient, a signal indicating an incomplete status for the defined partition.

* * * * *